United States Patent
Gahang

[11] Patent Number: 5,838,463
[45] Date of Patent: Nov. 17, 1998

[54] BINARY IMAGE PROCESSOR

[75] Inventor: Goo-Soo Gahang, Kyungki-do, Rep. of Korea

[73] Assignee: SamSung Electronics Co., Ltd., Suwon, Rep. of Korea

[21] Appl. No.: 515,095

[22] Filed: Aug. 14, 1995

[30] Foreign Application Priority Data

Aug. 12, 1994 [KR] Rep. of Korea .................. 19901/1994

[51] Int. Cl.$^6$ .............................. H04N 1/40; G06K 9/40
[52] U.S. Cl. ........................ 358/465; 358/461; 382/266; 382/274; 382/254
[58] Field of Search ..................................... 358/455, 456, 358/457, 460, 461, 465; 382/264, 266, 269, 274, 254

[56] References Cited

U.S. PATENT DOCUMENTS

| | | | |
|---|---|---|---|
| 5,165,072 | 11/1992 | Kurita | 358/448 |
| 5,408,338 | 4/1995 | Koike | 358/448 |
| 5,446,476 | 8/1995 | Kouzaki | 347/232 |
| 5,523,861 | 6/1996 | Tanaka et al. | 358/461 |

OTHER PUBLICATIONS

"Television Engineering Handbook"; Benson; pp. 2.29, 4.18, 4.19, 17.10, 17.11.

*Primary Examiner*—Thomas D. Lee
*Assistant Examiner*—Jerome Grant, II
*Attorney, Agent, or Firm*—Robert E. Bushnell, Esq.

[57] ABSTRACT

A low cost binary image processor in an image processing apparatus designed to perform the shading correction and binarize the edge emphasis of an image with an automatic gain control according to background intensity using half-tone processing. This binary image processor comprises an image sensor for reading an image from a document, a converter for converting an electric signal read-out from said image sensor into image data, a threshold generator for generating a threshold value corresponding to each input pixel of the image data, an image processor for correcting shading and emphasizing edge of said image data to produce processed data having said shading corrected and edge emphasized on a line-by-line basis, and a binarizing circuit for using half-tone processing to binarize each pixel of the processed data on a basis of said threshold value and generate binary data accurately representing the image.

38 Claims, 11 Drawing Sheets

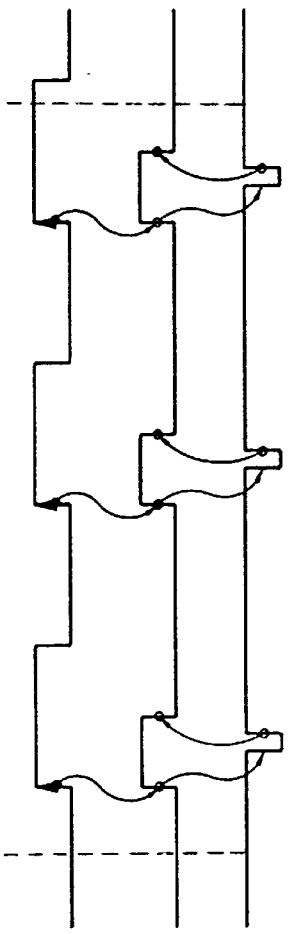
FIG. 10A CKPX
FIG. 10B SDRQ
FIG. 10C SDACK
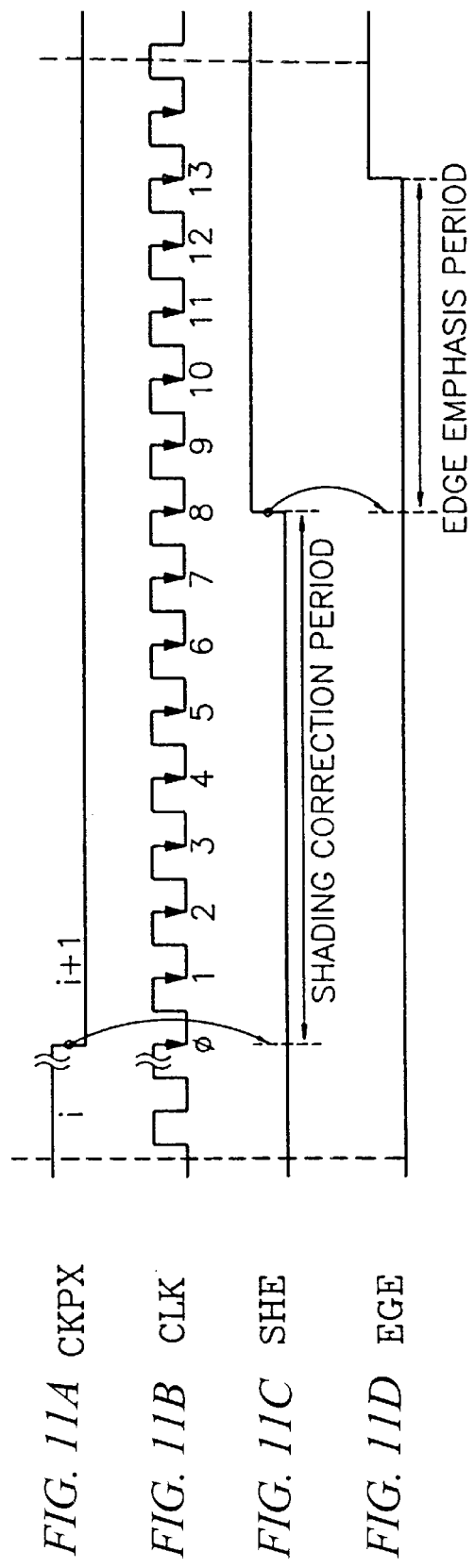
FIG. 11A CKPX
FIG. 11B CLK
FIG. 11C SHE
FIG. 11D EGE

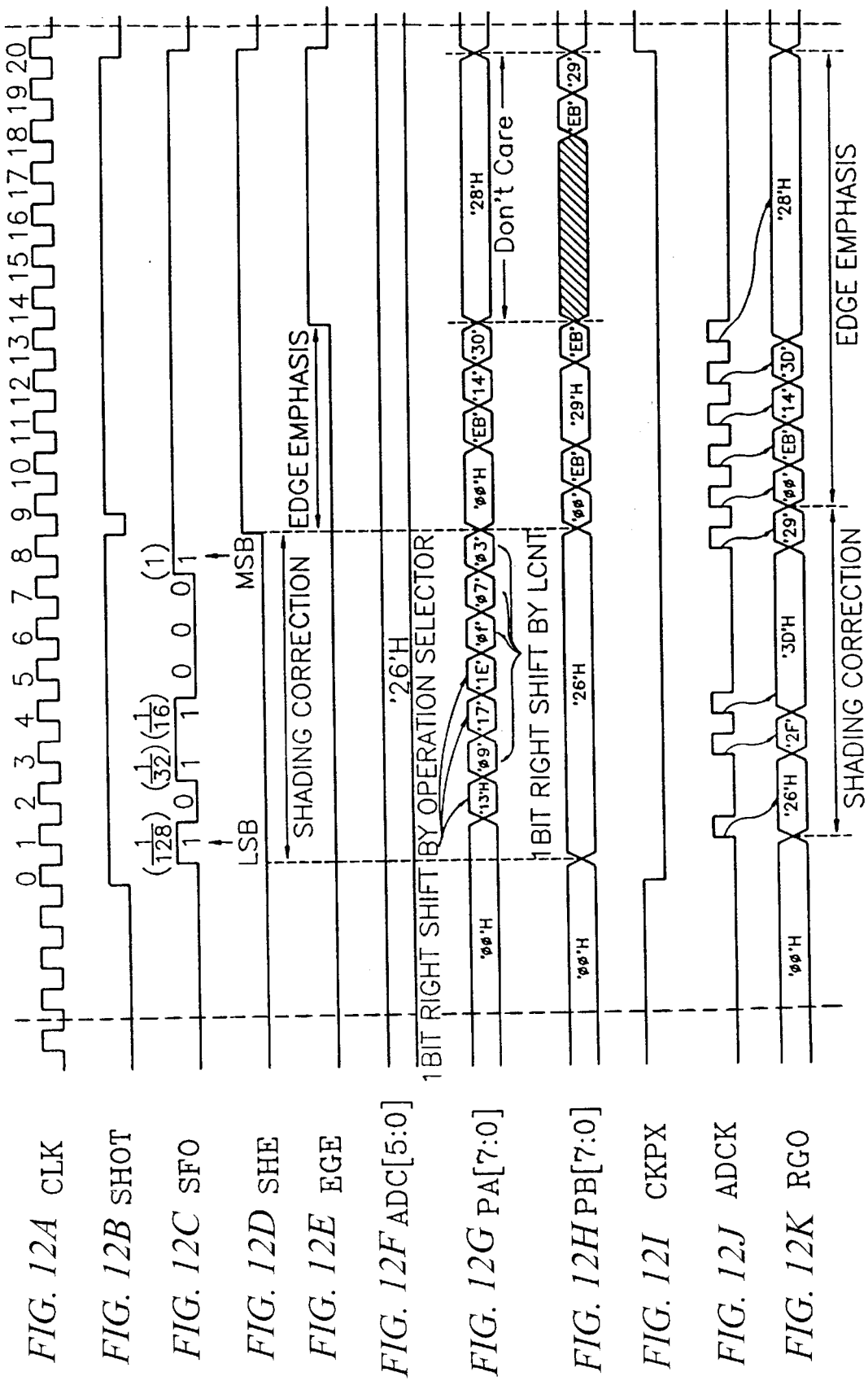

FIG. 14A CLK 
FIG. 14B IN 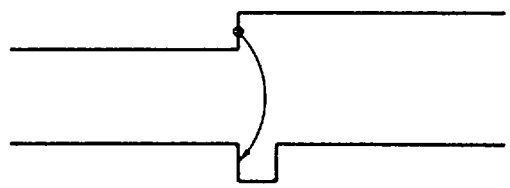
FIG. 14C SHOT 

BINARY IMAGE PROCESSOR

CROSS-REFERENCE TO RELATED APPLICATIONS

This application makes reference to, incorporates the same herein, and claims all benefits accruing under 35 U.S.C. §119 from an application for *Binary Image Processor* earlier filed in the Korean Industrial Property Office on Aug. 12, 1994 and assigned Ser. No. 19901/1994.

BACKGROUND OF THE INVENTION

1. Technical Field

The present invention relates to a system for copying and/or transmitting a document, and more particularly to a binary image processor for generating a binary image exhibiting high degree of resolution for a low cost facsimile machine.

2. Background Art

Conventional image processing apparatuses for electrically performing various types of image processing are exemplified by facsimile machines and copying machines. In these apparatuses, an original image is illuminated by a light source, and the light reflected by the original image is read and converted into an electrical signal by an image sensor such as a CCD sensor. The electrical signal is then subjected to A/D conversion, shading correction to correct dispersion of image data due to differences in sensitivity between any image sensing elements of the image sensor, light intensity distribution of the light source is the main scanning direction, distortion of lens or the like, and subsequently converted into binary data using half-tone processing to be used for a binary image display or recording in an arrangement of dots formed of display dots and non-display dots. One example for such a conventional shading correction technique is disclosed in U.S. Pat. No. 4,524,388 issued to Abe et al. and U.S. Pat. No. 5,267,055 for *Image Signal Processing Apparatus* issued to Sakamoto et al.

When half tone is reproduced in such a binary image, image data is binarized compared with threshold data in accordance with an area gradation method represented by a density pattern method or a dither method, and tone reproduction is performed to determine the number of display dots per unit area in dependence upon the density of the original image. When the tone reproduction is performed however, in edge portion of a character image and a line image, display dots become sparse and cause edge loss, thereby resulting in a degradation in the quality of an image.

Accordingly, it has been necessary for image data to be corrected in advance at the preceding stage of tone reproduction in order to prevent such a degradation in the quality of an image. Conventional art designed to obtain a clear image without blurring the contours is disclosed for example, in U.S. Pat. No. 5,408,338 for *Image Processing Unit Processing Pixel Data According To Scan Line Density* issued to Koike. Conventional shading correction and edge emphasis techniques used to obtain high quality image are disclosed in U.S. Pat. No. 5,253,083 for *Image Reading Apparatus Having Improved Shading Correction* issued to Hirota, U.S. Pat. No. 5,165,072 for *Image Processing Apparatus Which Detects A Line Image* issued to Kurita et al., U.S. Pat. No. 5,130,820 for *Image Processing Device* issued to Hirota, U.S. Pat. No. 5,086,484 for *Image Processing Apparatus With Fixed Or Variable Threshold* issued to Katayama et al., and U.S. Pat. No. 4,942,461 for *Digital Multiple-Color Image Processing Apparatus* issued to Abe et al. In these arrangements however, I have observed that the circuits are large and complicated, and consequently, the image processing systems are costly.

SUMMARY OF THE INVENTION

Accordingly, it is therefore an object of the present invention to provide a binary image processor for generating a binary image exhibiting high resolution for a low cost and compact image processing system.

It is another object of the present invention to a binary image processor for performing shading correction and edge emphasis so that an image of a document read-out in a facsimile system could be processed as a binary image exhibiting high resolution.

It is still another object of the present invention to provide a binary image processor for generating a binary image exhibiting high resolution at low cost, for either direct printing or transmission to another remote image processing system for printing.

It is a further object of the present invention to provide a binary image processor for executing shading correction, edge emphasis, half-tone process and automatic gain control (background) in order to obtain a binary image exhibiting high resolution in a relatively low cost facsimile machine.

In order to achieve these and other objects of the present invention, a novel binary image processor is provided for processing an original image of the document such that the binary image processor could generate a binary image that is substantially identical to the original image. The binary image processor according to the present invention executes the shading correction, binarization of the edge emphasis, an automatic gain control according to background intensity and the half-tone process, etc., of an image of an input document. Particularly in the binarization process of edge emphasis executed in the present invention, the binary image processor establishes a local mask of 1×3 to a central pixel, assigns an edge emphasis weighting factor pre-fixed to each of the corresponding pixels, and then compares the result values with a predetermined threshold value through simulation, then performs the binarization of the image.

To further achieve the above object, the binary image processor according to the present invention comprises a memory for storing a shading factor for a shading correction, a voltage peak value corresponding to a white reference of an image and a threshold value for determining a black or white pixel of the image; a threshold generator for generating the threshold value to be stored in the memory by a line clock of a given pixel unit and by a pixel clock corresponding to each pixel; a voltage peak controller for comparing image data obtained from reading an image with voltage peak value stored in the memory, so as to adaptively control the voltage peak value corresponding to the white reference of the image, and for restoring the compared voltage peak value in the memory; a shading correction controller for generating a shading correction signal for the shading correction of the image during a predetermined time period provided by the pixel clock; an edge emphasis controller for generating an edge emphasis signal for an edge emphasis of the image during a predetermined time period provided by the shading correction signal; an edge emphasis masking unit for masking the image data so as to perform one or more levels of the edge emphasis on a given pixel, and for emphasizing an edge of the masked image data in response to the edge emphasis signal; an operation unit for selecting and operating arithmetically the image data and the masked image data in response to the shading correction signal and the edge emphasis signal; a binary image determining unit for determining whether the image data corresponds to a black or white pixel of an image by comparing a value operated arithmetically by the operation unit with the threshold value; and a data output unit for outputting binary image data representing an binary image exhibiting high resolution determined in the binary image determining unit for direct printing or transmission in correspondence with either a transmission mode or a copy mode.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIGS. 10A–10C illustrate waveform diagrams of the shading factor DMA (direct memory access) generator 32 as shown in FIG. 2;

FIGS. 11A–11L illustrate waveform diagrams of the shading correction controller 22 and the edge emphasis controller 24 as shown in FIG. 2;

FIGS. 12A–12K illustrate detailed waveform diagrams of the operation unit 20 as shown in FIG. 2;

FIGS. 13A, 13B and 13C are diagrams illustrating a degree of edge emphasis of the edge emphasis mask unit, in which FIG. 13A shows a case where the edge emphasis is performed to a large extent, in which FIG. 13B shows a case where the edge emphasis is performed to a small extent, and in which FIG. 13C shows pixel brightness values in case that the edge emphasis is not performed, the edge emphasis is performed to a large extent, and the edge emphasis is performed to a small extent.

FIGS. 14A–14C illustrate waveform diagrams of the shot pulse generator 64 as shown in FIG. 3.

DETAILED DESCRIPTION OF THE PREFERRED EMBODIMENT

Figure 1:
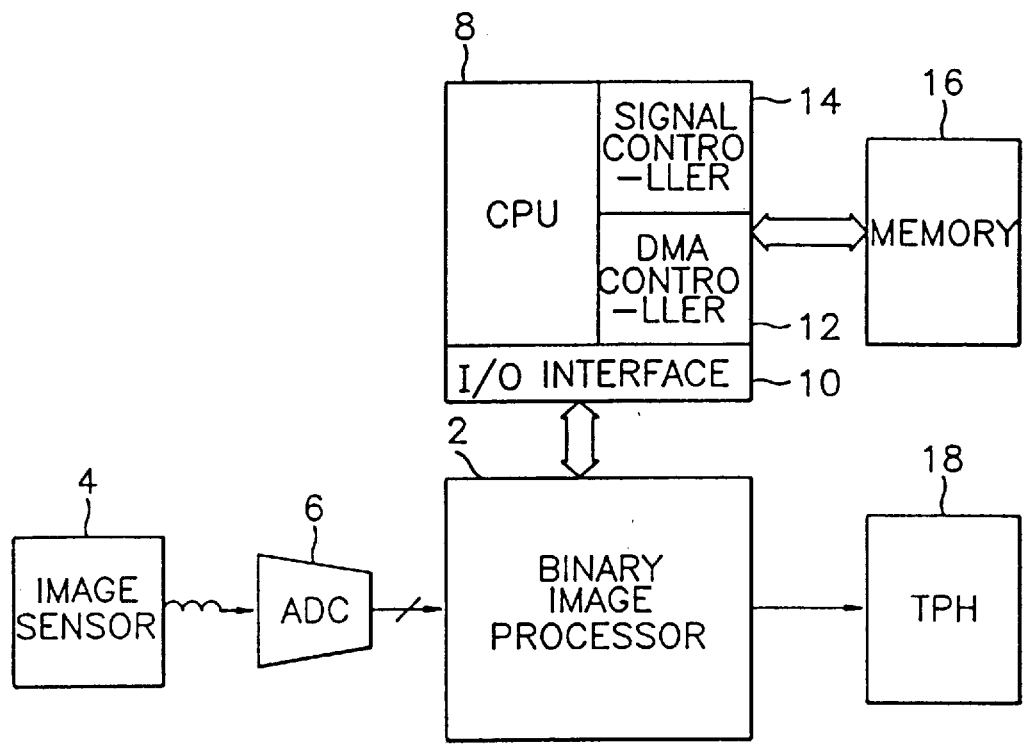
FIG. 1 illustrates a schematic block diagram of a system for executing binarization of a document according to the present invention.

Referring now to the drawings and particularly to FIG. 1, which illustrates a facsimile system for generating a binary image from image of a document as constructed in accordance with the principles of the present invention. The facsimile system of FIG. 1 is composed of a binary image processor 2 for processing a shading correction, an edge emphasis, an automatic gain control, a half-tone process and a threshold intensity value generation for determining a black or white pixel in a given unit in correspondence with a background intensity of the document; an image sensor 4 for reading the image of a document and for generating an analog signal corresponding to the image read-out; an analog-to-digital converter 6 (hereinafter, referred to as "ADC") for converting the analog signal outputted from the image sensor 4 into a digital signal; a control unit composed of a central processing unit CPU 8, an input and output (I/O) interface 10, a direct memory access (DMA) controller 12 and a signal controller 14, for controlling the binary image processor 2; a memory 16 for storing image-processed data at the binary image processor 2 under the control of the CPU 8; and a thermal print header (hereinafter, referred to as "TPH") 18 for printing the document image outputted from the binary image processor 2 under the control of binary image processor 2.

As is apparent from FIG. 1, an image is read from an original document by the image sensor 4 which consists essentially of a photoelectric conversion element (not shown) such as a CCD and a driver unit (not shown) for scanning it. A voltage-level signal which corresponds to the density of the read-out image is output from the image sensor 4 to an ADC 6, where the voltage-level signal is converted into a digital signal. The digital signal is then inputted to the binary image processor 2 for binarization. The binary image processor 2 for processing the binary image operates reciprocally with the controllers of the system, namely the CPU 8, the DMA controller 12 and the signal controller 14, and thereby processes the digital signal of ADC 6 into the binary image. The binary image processed by the binary image processor 2 is outputted to the TPH 18 as copy mode data for copying the document, or in the alternatively, to the DMA controller 12 as transmission mode data for transmitting the document, in accordance with the control of the binary image processor 2.

The memory 16 for responding to the control of CPU 8 stores a voltage peak value of the image, a threshold value for determining the black or white value of each pixel of an image and a shading factor value for the shading correction, etc. In order to effectively store the voltage peak value of the shading correction as a white reference in the memory 16 of the present invention, circuits for storing and reproducing shading correction reference image data as disclosed in the Korean Patent Application Nos. 91-8546 and 91-12829 assigned to the same assignee of the present invention are incorporated by reference herein.

Specifically, the Korean Patent Application No. 91-8546 filed on May 25, 1991 discloses a circuit for storing and reproducing shading correction reference image data wherein a range of variable amount of white reference image data is adjusted to a proper level, and the white reference image data is stored and then sequentially reproduced by pixels. The advantage of this circuit is that the size of a random access memory (RAM) can be reduced and the chip can be constructed in a compact manner. Similarly, the Korean Patent Application No. 91-12829 filed on Jul. 25, 1991 discloses a circuit for performing shading correction by storing the shading correction reference data in a system memory wherein the image data is stored in the system memory by an usable address bus and data bus for subsequent shading correction. The advantage of this circuit is that additional RAM is not required for storing the shading correction reference data. These circuits may be used to store voltage peak value of shading correction in the memory 16 of the present invention.

The DMA controller 12 interfaces with the binary image processor 2 for transmitting and receiving a DMA signal for shading correction, the shading factor value and control signals corresponding to a transmission mode. In order to control the binarization of the image data, the signal controller 14 generates a signal source to the binary image processor 2 through the I/O interface 10 under the control of the CPU 8.

A construction and operation of the binary image processor 2 for executing the binarization process of the image data will now be described in detail with reference to FIG. 2. The binary image processor 2 as constructed in accordance with the principles of the invention comprises a threshold generator 35 interfaced with the I/O interface 10, a shading factor DMA generator 32 and an edge emphasis mask unit 30 linked with the DMA controller 12, a shading correction and edge emphasis processing unit 100 comprising an operation unit 20, a shading correction controller 22 and an edge emphasis controller 24, a data output controller 38, a voltage peak controller 34, a shading correction post-processing unit 26 and an edge emphasis post-processing unit 28 connected to the shading correction and edge emphasis processing unit 100, and a data processing unit 200 comprising a binary image determining unit 36 and a data output unit 40 for outputting binary image exhibiting high resolution.

Figure 2:
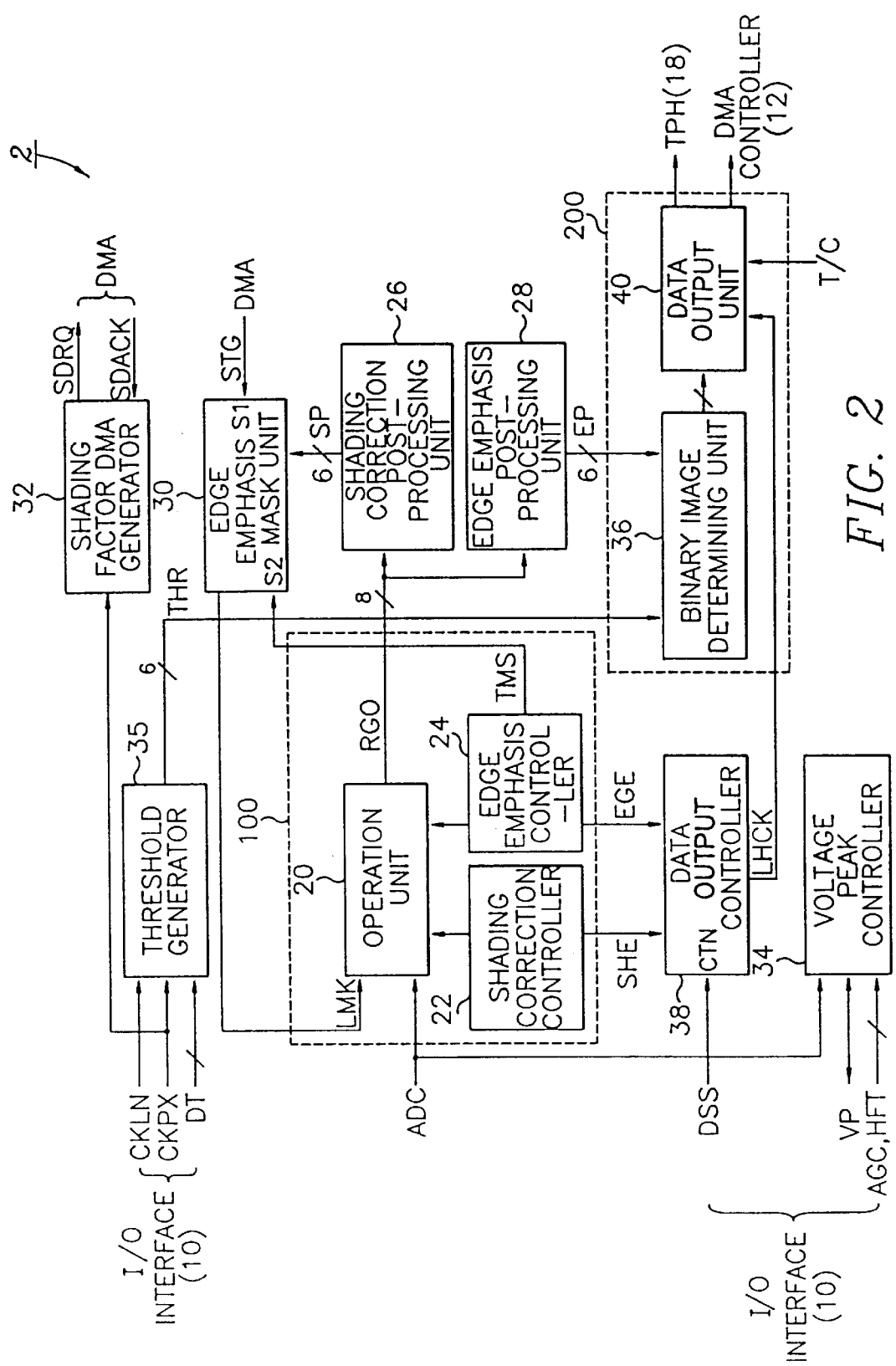
FIG. 2 illustrates a detailed circuit diagram of a binary image processor 2 as shown in FIG. 1 according to the present invention.

Referring to FIG. 2, an operation unit 20 receives a digital signal ADC outputted from the ADC 6, a shading factor by the DMA and a local mask signal LMK by which a given pixel is determined as an edge emphasis local mask for the edge emphasis. The operation unit 20 then executes the shading correction and the edge emphasis in response to a given shading correction signal and a given edge emphasis signal. A shading correction controller 22 generates the shading correction signal SHE to the operation unit 20 under the control of CPU 8 so that the operation unit 20 can perform the shading correction. An edge emphasis controller 24 generates the edge emphasis signal EGE to the operation unit 20 under the control of the CPU 8 so that the operation unit 20 can perform the edge emphasis. The shading correction controller 22 and the edge emphasis controller 24 respectively output the shading correction signal SHE and the edge emphasis signal EGE to a data output controller 38 for controlling binary image output after the shading is corrected and the edge portion is emphasized. A shading correction post-processing unit 26 and an edge emphasis post-processing unit 28 process output data RGO from the operation unit 20 by a given unit of binary bits, and generate processed data SP and EP, respectively.

An edge emphasis mask unit 30 masks the data SP processed in the shading correction post-processing unit 26 by a given unit of pixels so as to emphasize the given pixel of the document image, and then produces the masked edge emphasis data LMK to the operation unit 20 where the edge emphasis can be performed. A shading factor DMA generator 32 transmits and receives DMA control signals SDRQ and SDACK to and from the DMA controller 12 used for loading the shading factor in response to a pixel clock CKPX outputted from the signal controller 14. Upon reception of an automatic gain control enable signal AGC and a half-tone mode signal HFT, a voltage peak controller 34 compares a voltage peak value VP stored in the memory 16 with the digital signal ADC outputted from the ADC 6 and then generates a new voltage peak value VP adapted to the present document to be stored in the memory 16.

A threshold generator 35 generates, as the threshold value DT stored in the memory 16 under the control of the CPU 8, a new threshold value THR for the given pixel determined by a pixel clock CKPX and a line clock CKLN generated by the signal controller 14. A binary image determining unit 36 compares the threshold value THR outputted from the threshold generator 35 with a data value EP outputted from the edge emphasis post-processing unit 28 in order to determine the image data of a document as the binary data corresponding to the black and white values of each pixel. In order to effectively control the data output, the data output controller 38 as constructed in accordance with the principles of the present invention receives the shading correction signal SHE outputted from the shading correction controller 22 and the edge emphasis signal EGE outputted from the edge emphasis controller 24, and generates a latch clock LHCK in response to a data selecting signal DSS supplied from the signal controller 14 under the control of the CPU 8. A data output unit 40 then outputs binary image data determined by the binary image determining unit 36 in accordance with the latch clock LHCK supplied from the data output controller 38 either to the DMA controller 12 when a mode selection signal T/C represents a transmission mode, or alternatively, to the TPH 18 when the mode selection signal T/C represents a copy mode.

The CPU 8 as shown in FIG. 1 controls the signal controller 14 to generate the pixel and line clocks CKPX and CKLN to the threshold generator 35 via the I/O interface 10, so that the threshold generator 35 could generate the threshold value DT stored for each respective pixel in the memory 16. The CPU 8 also controls the generation of the automatic gain control enable signals AGC and the half-tone mode signal HFT to the voltage peak controller 34 via the I/O interface 10 so that the voltage peak controller 34 could compare the voltage peak value VP stored in the memory 16 with the digital signal ADC and produce a new voltage peak value VP for each corresponding pixel of the digital signal ADC to be stored in the memory 16.

Operations of the shading factor DMA generator 32 will now be described in detail with reference to FIGS. 2 and 10A–10C. FIGS. 10A–10C illustrate waveform diagram of the input/output signals of the shading factor DMA generator 32. In FIGS. 10a, the input CKPX is a pixel clock outputted from the signal controller 14 through the I/O interface 10 under the control of the CPU 8 so that the given image data could be processed by each pixel unit. The output SDRQ as shown in FIG. 10B is a shading factor DMA requiring signal outputted from the shading factor DMA generator 32, and the input SDACK as shown in FIG. 10C is a shading factor DMA recognizing signal outputted from the DMA controller 12 in response to the shading factor DMA requiring signal.

Figure 3:
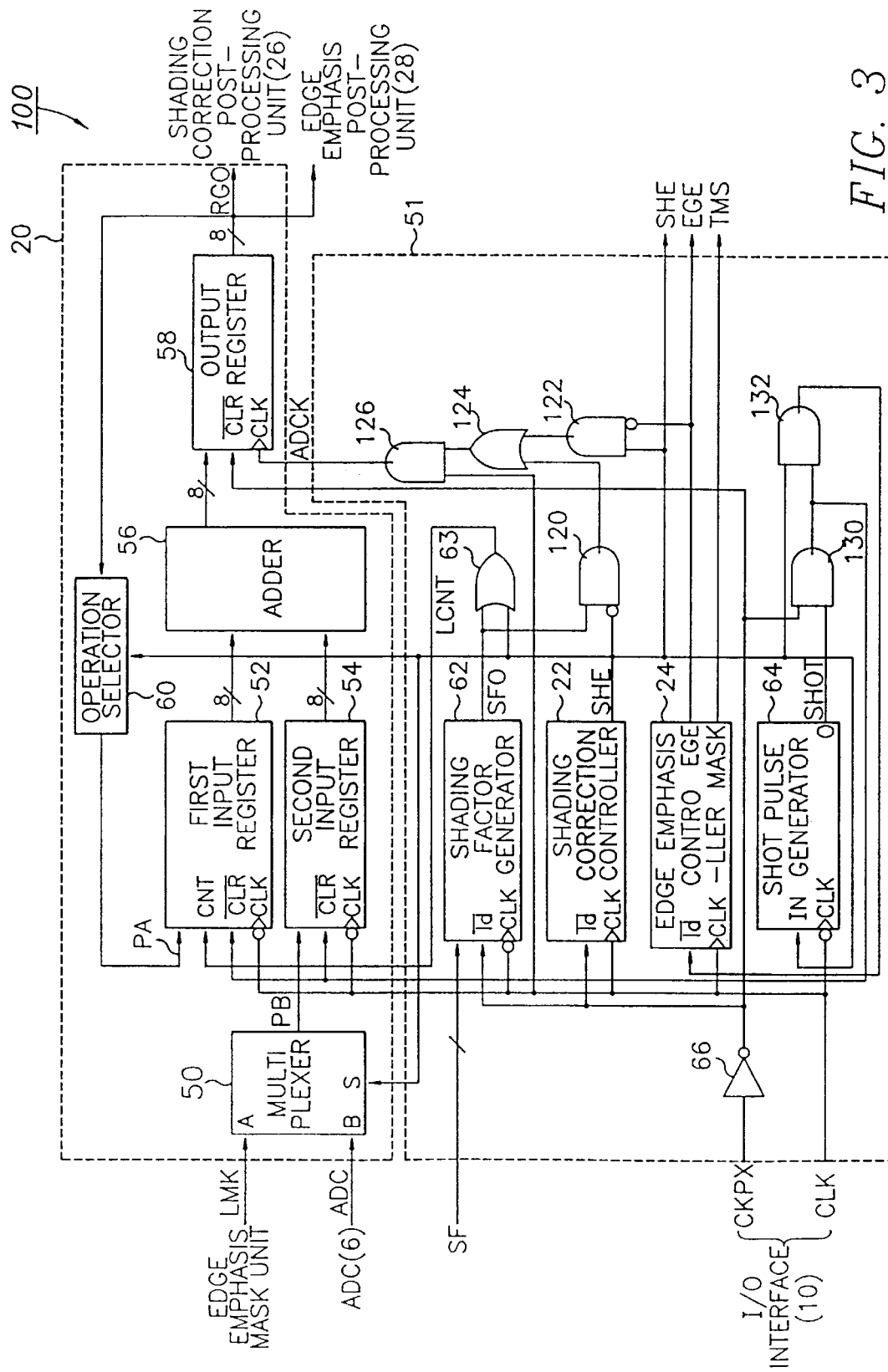
FIG. 3 illustrates a detailed block diagram of a shading correction and edge emphasis processing unit 100 comprising an operation unit 20, a shading correction controller 22 and an edge emphasis controller 24 as shown in FIG. 2.

Referring now to the waveform diagram of FIGS. 10A–10C, the shading factor DMA generator 32 outputs the shading factor DMA requiring signal SDRQ exhibiting an active "high" state to the DMA controller 12 in response to reception of a leading edge of the pixel clock CKPX. The DMA controller 12 then outputs the shading factor DMA recognizing signal SDACK exhibiting an active "low" state to the shading factor DMA generator 32 in response to the shading factor DMA requiring signal SDRQ exhibiting an active "high" state. Then, the shading factor DMA generator 32 changes the shading factor DMA requiring signal SDRQ to a logic "low" state in response to the shading factor DMA recognizing signal SDACK. When the shading factor DMA recognizing signal SDACK is in an active "high" state, the DMA controller 12 reads the shading factor value stored in the memory 16. During the time when the shading factor DMA recognizing signal SDACK is in an active "low" state, the DMA controller 12 loads the shading factor value SF stored in memory 16 to in a shading factor generator 62 of the binary image processor 2 (not shown in FIG. 2, but is shown in FIG. 3). The shading factor SF is a value for shading correction correcting image distortion occurring in the image sensor 4, and is stored in the memory 16 to meet the characteristics of the image sensor 4.

The operation unit 20 of FIG. 2 performs the shading correction and the edge emphasis of image data upon reception of the digital signal ADC outputted from the ADC 6 and the local mask signal LMK outputted from the edge emphasis mask unit 30. The operation unit 20 operates as a multiplier when the image shading is corrected in response to the shading correction signal SHE outputted from the shading correction controller 22, and operates as a multi-term adder when the edge emphasis is performed in response to the edge emphasis signal outputted from the edge emphasis controller 24.

FIG. 3 illustrates a detailed circuit diagram of the shading correction and edge emphasis processing unit 100 that comprises the operation unit 20, the shading correction controller 22 and the edge emphasis controller 24 as constructed in accordance with the principles of the present invention. The shading correction controller 22 and the edge emphasis controller 24 are part of the operation control signal generator 51 for generating first to forth operation control signals so as to control the operation unit 20 to execute the shading correction and the edge emphasis of an image. As shown in FIG. 3, the operation unit 20 is composed of a multiplexer 50 for multiplexing between the local mask signal LMK outputted from the edge emphasis mask unit 30 of FIG. 2 and the digital signal ADC outputted from the ADC 6 of FIG. 1, and for generating selected data PB in accordance with the first operation control signal generated by the operation control signal generator 51; an operation selector 60 for performing shift of a given bit for the output data RGO, and for generating shifted data in response to the first operation control signal generated by the operation control signal generator 51 so that the operation unit 20 could operate either as a multi-term adder for edge emphasis, or as a multiplier for shading correction; a first input register 52 for temporarily storing data PA outputted from the operation selector 60 in accordance with a second operation control signal generated by the operation control signal generator 51; a second input register 54 for temporarily storing data PB selected and outputted from the multiplexer 50 in accordance with the third operation control signal generated by the operation control signal generator 51; an adder 56 for adding up the data stored temporarily in the first and second input registers 52 and 54; and an output register 58 for temporarily storing the data added by the adder 56, and for outputting the data RGO in accordance with the fourth operation control signal generated by the operation control signal generator 51.

The operation control signal generator 51 is composed of a shading factor generator 62, a shot pulse generator 64, a shading correction controller 22, an edge emphasis controller 24, and a plurality of logic gates. The shading factor generator 62 receives the shading factor SF stored in the memory 16 under the control of DMA controller 12, and generates a shading factor control signal SFO in, response to the pixel clock CKPX and a clock CLK. The shading factor SF has values in the range from 1.0 to 2.0 as a real number value, wherein 1.0 is equal to '80'H (Hexa) and 2.0 is equal to 'FF'H. FIG. 12C illustrates a waveform in which the shading factor control signal SFO has the real number value of 1.1, namely '80'H. When '80'H is calculated as the real number value, it is given by an expression of:

$$1 + \frac{1}{16} + \frac{1}{32} + \frac{1}{128} \approx 1.1.$$

The shot pulse generator 64 receives the shading correction signal SHE outputted from the shading correction controller 22, and then generates a shot pulse signal SHOT as shown in FIG. 14C in response to the clock as shown in FIG. 14A through the I/O interface 10. An input and output waveform diagram of the shot pulse generator 64 is shown in FIGS. 14B and 14C. The shot pulse signal SHOT is AND gated with the pixel clock $\overline{CKPX}$, so as to control operation of the first and second input registers 52 and 54 of the operation unit 20.

The shading correction controller 22 as shown in FIG. 2 generates the shading correction signal SHE in response to the clock CLK and the pixel clock CKPX inverted by an inverter 66 so that the operation unit 20 could perform the shading correction. The edge emphasis controller 24 generates an edge emphasis signal EGE and a term selecting signal TMS so that the operation unit 20 could perform the operation of edge emphasis.

A number of logic gates 63, 120, 122, 124, 126, 130 and 132 perform logic gating operations for signals outputted from the shading factor generator 62, the shading correction controller 22, the edge emphasis controller 24 and the shot pulse generator 64. These logic gates output the first to fourth operation control signals to the multiplexer 50, the first input register 52, the second input register 54 and the output register 58 of the operation unit 20. The plurality of logic gates are constructed as follows.

The OR gate 63 logical-ORs the shading factor control signal SFO outputted from the shading factor generator 62 and the shading correction signal SHE outputted from the shading correction controller 22, and then outputs a logical-ORed result to a control terminal CNT of the first input register 52. The AND gate 130 logical-ANDs the shot pulse signal SHOT outputted from the shot pulse generator 64 and the pixel clock CKPX inverted by the inverter 66, and then outputs a logical-ANDed result to clear terminals $\overline{CLR}$ of the first input register 52 and the second input register 54. The AND gate 132 logical-ANDs the shading correction signal SHE outputted from the shading correction controller 22 and the logical-ANDed result outputted from the AND gate 130, and then outputs a logical-ANDed result to an input terminal of the edge emphasis controller 24. A signal inputted to the input terminal IN of the shot pulse generator 64 is the shading correction signal SHE as shown in FIG. 14B. The AND gate 120 logical-ANDs an inverted of the shading correction signal SHE outputted from the shading correction controller 22 and the shading factor control signal SFO outputted from the shading factor generator 62, then outputs a logical-ANDed result. The AND gate 122 logical-ANDs the shading correction signal SHE outputted from the shading correction controller 22 and an inverted of the edge emphasis signal EGE outputted from the edge emphasis controller 24, and then outputs a logical-ANDed result thereof. The OR gate 124 logical-ORs the outputs of the AND gate 120 and the AND gate 122, and then outputs a logical-ORed result thereof. The AND gate 126 then logical-ANDs the logical-ANDed result outputted from the OR gate 124 and the pixel clock CKPX inverted by the inverter 66, and applies the logical-ORed result to a clock terminal CLK of the output register 58 of the operation unit 20.

Figure 4:
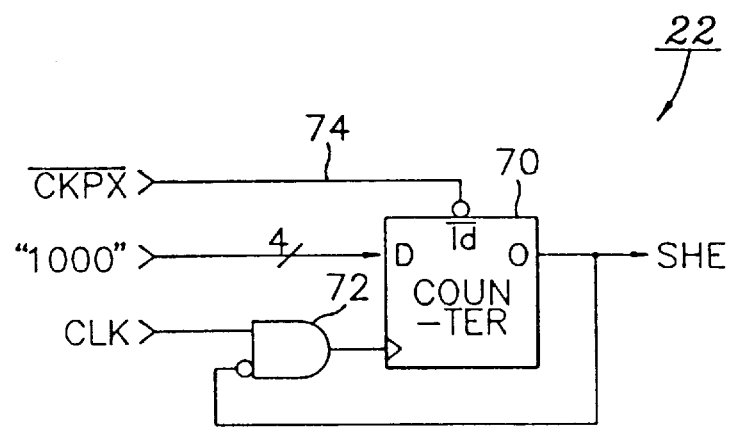
FIG. 4 illustrates a detailed circuit diagram of the shading correction controller 22 as shown in FIG. 3.

FIG. 4 illustrates a detailed circuit diagram of the shading correction controller 22 as comprising a counter 70 for counting a predetermined counting value (a binary digit "1000") in response to a given clock CLK applied to its clock terminal, and an AND gate 72 for logically combining the output of the counter 70 and the clock CLK and applying the logical-ANDed result to the clock terminal of the counter 70.

Referring to FIG. 4, operation of the shading correction controller 22 is described in detail as follows. The pixel clock $\overline{CKPX}$ inverted through the inverter 66 as shown in FIG. 3 is applied to line 74 connected to a preset terminal $\overline{1d}$ of the counter 70. The AND gate 72 logical-ANDs the clock CLK and a signal inverted from the output signal of the counter 70, and then applies the logical-ANDed result to the clock terminal. Accordingly, the counter 70 is then preset by the inverted pixel clock $\overline{CKPX}$, and counts the pulses up to the predetermined count value (the binary digit "1000") in response to the logical-ANDed result outputted from the AND gate 72. While the counter 70 counts, the output signal of the counter 70, namely the shading control signal SHE, is in the active "low" state. The shading control signal SHE is then supplied to an input terminal of the operation selector 60, the AND gate 120 and a selecting terminal S of the multiplexer 50 as shown in FIG. 3, and the data output controller 38 as shown in FIG. 2.

Figure 5:
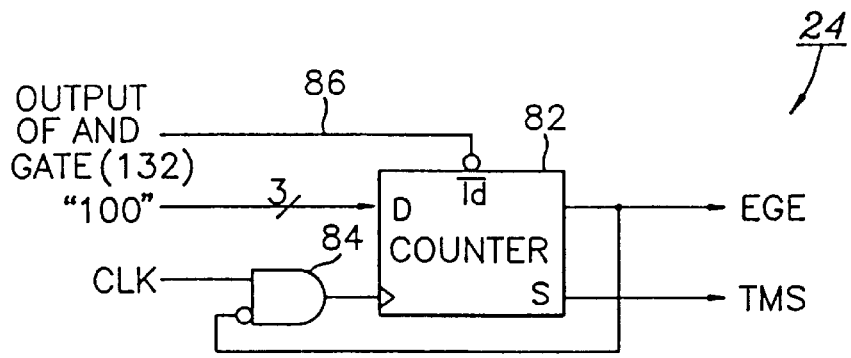
FIG. 5 illustrates a detailed circuit diagram of the edge emphasis controller 24 as shown in FIG. 3.

FIG. 5 illustrates a detailed circuit diagram of the edge emphasis controller 24 as comprising a counter 82 for counting a predetermined counting value (the binary digit "100") in response to the given clock CLK applied to the clock terminal, and an AND gate 84 for logical-ANDing the output of the counter 82 and the clock CLK and applying the logical-ANDed result to the clock terminal of the counter 82. The circuit construction of the edge emphasis controller 24 as shown in FIG. 5 is similar to that of the shading correction controller 22 as shown in FIG. 4.

Referring to FIG. 5, the operation of the edge emphasis controller 24 will be described in detail as follows. The signal outputted from the AND gate 132 as shown in FIG. 3 is applied to line 86 connected to a preset terminal $\overline{1d}$ of the counter 82. The AND gate 84 logical-ANDs the clock CLK and an inverted of the edge emphasis signal EGE generated from the counter 82, and then applies the logical-ANDed result to the clock terminal of the counter 82. The counter 82 is then preset by the signal outputted from the AND gate 132 as shown in FIG. 3, and after that, counts till the predetermined count value (the binary digit "100") in response to the output of the AND gate 84 applied to the clock terminal. While the counter 82 counts, the output signal of the counter 82, namely the edge emphasis signal EGE, is in the active "low" state. The edge emphasis signal EGE is applied to the AND gate 122 of the operation control signal generator 51 as shown in FIG. 3 and to the data output controller 38 of the operation unit 20 as shown in FIG. 2. When the counter 82 finishes counting upon achieving the predetermined count value (the binary digit "100"), the counter 82 outputs the term selecting signal TMS to the selecting terminal S2 of the edge emphasis mask unit 30 as shown in FIG. 2. In response to application of the term selecting signal TMS, the edge emphasis mask unit 30 one-by-one selects one weighting factor value from a plurality of weighting factor values for the edge emphasis.

FIGS. 11A–D illustrate waveform diagrams of the shading correction controller 22 as shown in FIG. 4 and the edge emphasis controller 24 as shown in FIG. 5. As shown in FIGS. 11A–11B, when the pixel clock CKPX is charged to the active "low" state, the shading correction signal SHE of FIG. 11C goes to the active "low" state and maintains in the active "low" state while the counter 70 of the shading correction controller 22 counts till the predetermined counting value, namely till the binary digit value "1000". The edge emphasis signal EGE of FIG. 11D goes to the active state in response to the output of AND gate 132, and maintains in the active "low" state while the counter 82 of the edge emphasis controller 24 counts till the predetermined counting value, namely the binary digit value "100". When the shading correction signal SHE is in the logic "low" state, the operation unit 20 performs the shading correction. When the edge emphasis signal EGE is in the logic "low" state, the operation unit 20 performs the edge emphasis of an image.

Returning to FIG. 3, the operation of the operation unit 20 is described in detail by reference to waveform diagram of FIGS. 12A–12K as follows. FIGS. 12A–12K illustrates the waveform diagram of various input/output signals when the operation unit 20 performs the shading correction.

The digital signal ADC corresponding to the document image and outputted from the ADC 6, is inputted to an input terminal B of the multiplexer 50. The local mask signal LMK outputted from the edge emphasis mask unit 30 is inputted to an input terminal A of the multiplexer 50. The digital signal ADC could be 6 bits or 8 bits data. Here however, it is assumed that the digital signal ADC is 6 bits data and has '26'H value. Accordingly, the multiplexer 50 selectively transmits either the digital signal ADC or the local mask signal LMK inputted to the input terminals A and B in response to the shading correction signal SHE outputted from the shading correction controller 22. When the shading correction signal SHE is in the logic "low" state, the multiplexer 50 selects the digital signal ADC from the input terminal B for transmission. When the shading correction signal SHE is in the logic "high" state however, the multiplexer 50 selects the local mask signal LMK from the input terminal A for transmission. The selected signal is then applied to the second input register 54. During a shading correction period when the shading correction signal SHE is in the logic "low" state, the value '26'H of the digital signal ADC becomes the value of the data PB.

Meanwhile, the operation selector 60 shifts by the given bit or does not shift the data RGO outputted from the output register 58, in response to a logic state of the shading correction signal SHE outputted from the shading correction controller 22. In case that the operation selector 60 shifts the data RGO, the operation unit 20 operates as a multiplier for the shading correction and the shading correction signal SHE received is in the logic "low" state. However, in case that the operation selector 60 does not shift the data RGO, the operation unit 20 operates as an adder for the edge emphasis and the shading correction signal SHE received is in the logic "high" state. The operation selector 60 can be embodied as a shift register, and if it is embodied as the shift register, a right shift, 1 bit by 1 bit, is performed when the shading correction signal SHE is in the logic "low" state, namely during the shading correction period. It can be appreciated that during the shading correction period, the value of 1 bit right shift by the operation selector 60 is '13'H, '09'H, '17'H and '1E'H.

The first input register 52 receives the data PA representing that the data RGO is shifted or is not shifted in the operation selector 60 and the latch control signal LCNT via a control terminal CNT. The latch control signal is generated from the OR gate 63 by logically combining the shading factor control signal SFO outputted from the shading factor generator 62 and the shading correction signal SHE outputted from the shading correction controller 22. When this latch control signal LCNT is in the logic "high" state, the result data RGO of the operation selector 60 is latched unchanged. But, when this latch control signal LCNT is in the logic "low" state, the latched result data is right shifted 1 bit by 1 bit in response to the clock signal CLK applied to the clock terminal.

Also, the second input register 54 receives an initiating pulse signal via a clear terminal $\overline{CLR}$ and begins to register the selected signal PB outputted from the multiplexer 50. The initiating pulse signal is the logical-ANDed result from the AND gate 130 that logically combines the shot pulse signal SHOT outputted from the shot pulse generator 64 and an inverted pixel clock $\overline{CKPX}$. This initiating pulse signal is applied not only to the clear terminal $\overline{CLR}$ of the first input register 52 but also to the clear terminal $\overline{CLR}$ of the second input register 54, and then initiates the data latched in the second input register B 54.

Figures 13A, 13B, 13C:
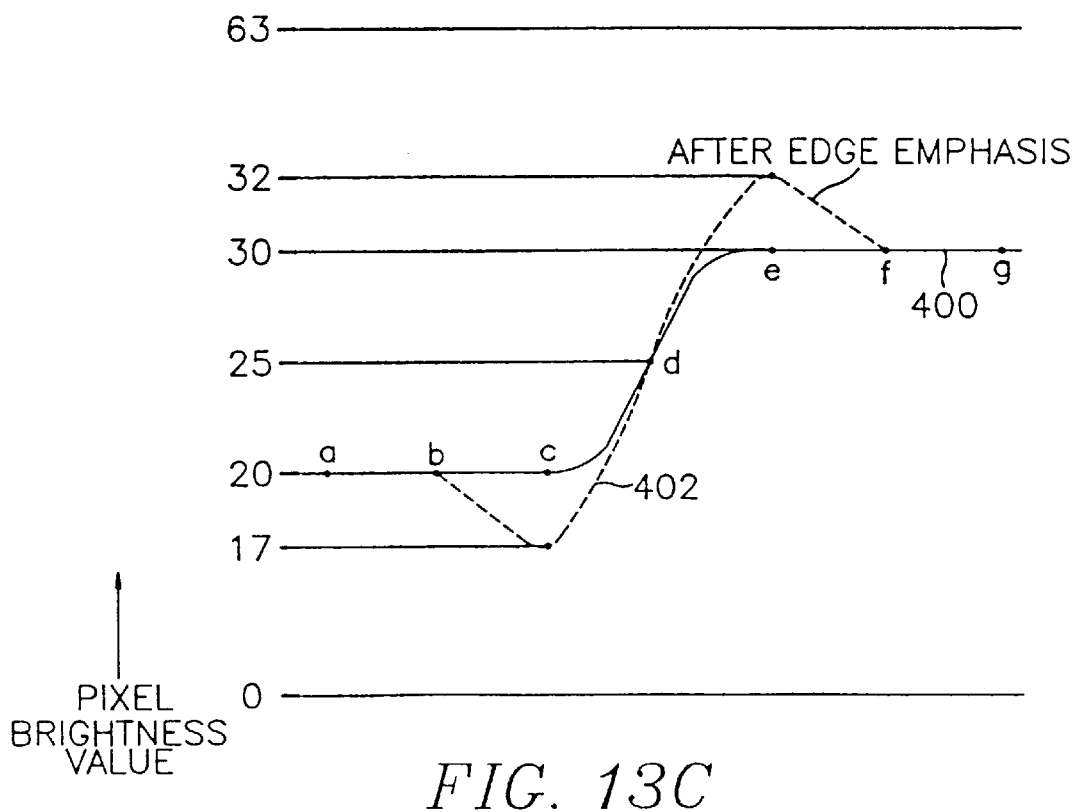

As shown in FIGS. 13A–13C, it can be appreciated that the data PA and PB are initialized as '00'H upon reception of the initiating pulse signal of AND gate 130. The 1 bit right shift by the latch control signal LCNT and the operation selector 60 is generated only during the shading correction operation, namely only when the operation unit 20 operates as the multiplier. The 1 bit right shift operation of the operation selector 60 is to obtain only 8 bits, and not 14 bits as a calculating result of 6 bits×8 bits, and to discard 1 bit of the least significant bit LSB generated after multiplying 1 bit by 1 bit. The reason why the 1 bit right shift operation has only 8 bits is that the number of assembling circuits is reduced since an 8 bits adder can be changed in a 14 bits adder, and the operation unit 20 should finally discard 6 bits even if the shift operation has the result of 14 bits. The 1 bit right shift of latch control signal LCNT is to perform the above-described function in case that the multiplied bit is "0".

Accordingly, the adder 56 adds the data outputted from the first and second input registers 52 and 54 till the initiating pulse signal is applied thereto. The output register 58 latches and outputs the data added by the adder 56 in response to the fourth operation control signal of operation control signal generator 51, namely a clock ADCK outputted from the AND gate 126. In case that the output clock ADCK is in the logic "high" state, the output of the output register 58 is latched. The data RGO outputted from the output register 58 is applied to the operation selector 60 for the shading correction or for the edge emphasis, and also is respectively applied to the shading correction post-processing unit 26 and the edge emphasis post-processing unit 28. When the shading correction is performed, the data RGO is corrected in the shading as value of PA+ADC → RGO, that is, '00'H+'26'H → '26'H, '09'H+'6'H → '2F'H, '17'H+'26'H → '3D'H and '03'H+'26'H → '29'H.

Returning now to FIG. 2, operations of the shading correction post-processing unit 26 and the edge emphasis post-processing unit 28 are described as follows.

The shading correction post-processing unit 26 limits the data RGO outputted from the operation unit 20, namely the data value of shading correct result, such that the data ROG could not exceed a prelimited value. For example, if the operation unit 20 outputs the data RGO of 8 bits, the shading correction post-processing unit 26 limits the data to data of 6 bits. Such limitation is made to discard of the more significant 2 bite out of the data RGO of 8 bits. Since the data RGO has a unit of 8 bits, the data has values of decimal digits 0 to 125. If the data RGO outputted from the operation unit 20 has the value over the decimal digit 63, namely over 6 bits, the shading correction post-processing unit 26 limits the data to the maximum value 63 of the decimal digit, and then outputs the value. The binary image data SP processed by the shading correction post-processing unit 26 is inputted to the edge emphasis mask unit 30 after the shading correction so that the edge emphasis for the given pixel can be performed.

In case that the data value processed for the edge emphasis in the operation unit 20 exceeds the prelimited value, the edge emphasis post-processing unit 28 as a logic circuit limits the exceeding data value to the prelimited value. Also the shading correction post-processing unit 26 performs the same operation as described above.

The value of the data RGO outputted when the operation unit 20 operates as the multi-term adder for the edge emphasis has a range from −63 to 126. Therefore, if the data value of 8 bits outputted from the operation unit 20 is smaller than the decimal digit 0, the edge emphasis post-processing unit 28 limits the data value to the decimal digit 0. If the data value is larger than the decimal digit 63, the edge emphasis post-processing unit 28 limits the data value to the decimal digit 63. That is, the range of a pixel brightness data value outputted from the edge emphasis post-processing unit 28 is from 0 to 63. The binary image data EP processed in the edge emphasis post-processing unit 28 is inputted to the binary image determining unit 36.

Figure 6:
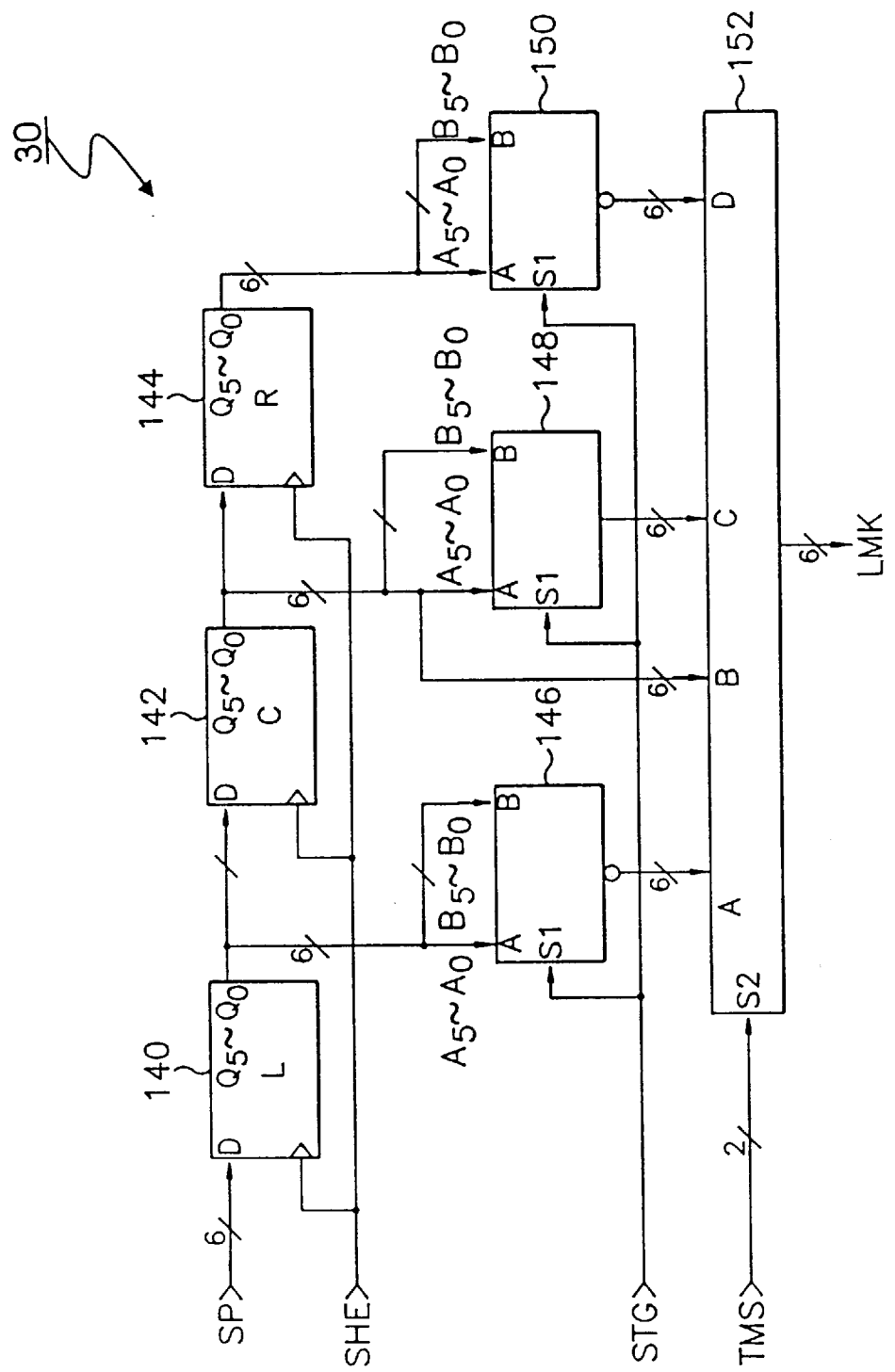
FIG. 6 illustrates a detailed circuit diagram of the edge emphasis mask unit 30 as shown in FIG. 2.

The detailed construction and operation of the edge emphasis mask unit 30 will be described in detail with reference to FIG. 6. As shown in FIG. 6, the edge emphasis mask unit 30 stores the brightness of three pixels of binary image data SP outputted from the shading correction post-processing unit 26 in registers 140, 142 and 144 in response to the shading correction signal SHE in order to perform the edge emphasis. The edge emphasis mask unit 30 selects a control degree of the edge emphasis in response to an edge emphasis control signal STG provided from the I/O interface 10. Also, the edge emphasis mask unit 30 represents a circuit unit for providing the pixel brightness value corresponding to the term selecting signal TMS provided from the edge emphasis controller 24.

FIG. 6 illustrates a detailed circuit diagram of the edge emphasis mask unit 30 as comprising three registers 140, 142 and 144 for masking the inputted binary image data SP and for storing the given pixel brightness value so as to produce the edge emphasis of the binary image data; first, second and third multiplexers 146, 148 and 150 connected respectively to output terminals of three registers 140, 142 and 144; and a fourth multiplexer 152 whose four input terminals are respectively connected to the first, second and third multiplexers 146, 148 and 150, and to C (center) register 142.

FIGS. 13A and 13B illustrate weighting factor values corresponding to different degrees of the edge emphasis in the edge emphasis mask unit 30. Specifically, FIG. 13A shows the weighting factor values when the edge emphasis is performed to a large extent, and the weighting factor values are selected when the edge emphasis control signal STG is equal to "0". FIG. 13B shows the weighting factor values when the edge emphasis is performed to a small extent, and the weighting factor values are selected when the edge emphasis control signal STG is equal to "1". FIG. 13C shows the data value of the local mask signal LMK outputted from the edge emphasis mask unit 30, which represents the edge emphasized pixel brightness value by the weighting factor value shown FIG. 13A.

The operation of edge emphasis mask unit 30 will be described more in detail with reference to FIGS. 6, 13A, 13B and 13C. L (left) register 140, C (center) register 142 and R (right) register 144 are of 6 bits registers. Output lines of the L and R registers 140 and 144 are connected to respective input terminals A of the first and third multiplexers 146 and 150 so that the 1 bit right shift can be performed. The output lines of the L and R registers 140 and 144 are also connected to respective input terminals B of the first and third multiplexers 146 and 150 so that the 2 bits right shift is performed. An output line of the C register 142 is connected to an input terminal A of the second multiplexer 148 without the bit shift, and is also connected to an input terminal B so that the 1 bit right shift can be performed. The following shows the connection between the output terminals $Q_5$ to $Q_0$ of the registers 140, 142 and 144, and the input terminals $A_5$ to $A_0$ and $B_5$ to $B_0$ of the first, second and third multiplexers 146, 148 and 150.

| | (MSB) | | | | | (LSB) |
|---|---|---|---|---|---|---|
| Output Terminals Q of L and R registers (140, 144): | $Q_5$ | $Q_4$ | $Q_3$ | $Q_2$ | $Q_1$ | GND |
| | / | / | / | / | / | / |
| Input Terminals A of First and Third Multiplexers (146, 150): | $A_4$ | $A_3$ | $A_2$ | $A_1$ | $A_0$ | $A_5$ |
| | (MSB) | | | | | (LSB) |

| | (MSB) | | | | | (LSB) |
|---|---|---|---|---|---|---|
| Output Terminals Q of L and R registers (140, 144): | $Q_5$ | $Q_4$ | $Q_3$ | $Q_2$ | GND | GND |
| | / | / | / | / | / | / |
| Input Terminals B of First and Third Multiplexers (146, 150): | $B_3$ | $B_2$ | $B_1$ | $B_0$ | $B_6$ | $B_5$ |
| | (MSB) | | | | | (LSB) |

| | (MSB) | | | | | (LSB) |
|---|---|---|---|---|---|---|
| Output Terminals Q of C and R registers 142: | $Q_5$ | $Q_4$ | $Q_3$ | $Q_2$ | $Q_1$ | $Q_0$ |
| | \| | \| | \| | \| | \| | \| |
| Input Terminals A of Second Multiplexer 148: | $A_5$ | $A_4$ | $A_3$ | $A_2$ | $A_1$ | $A_0$ |
| | (MSB) | | | | | (LSB) |

| | (MSB) | | | | | (LSB) |
|---|---|---|---|---|---|---|
| Output Terminals Q of C R registers 142: | $Q_5$ | $Q_4$ | $Q_3$ | $Q_2$ | $Q_1$ | GND |
| | \| | \| | \| | \| | \| | \| |
| Input Terminals B of Second Multiplexer 148: | $B_4$ | $B_3$ | $B_2$ | $B_1$ | $B_0$ | $B_5$ |
| | (MSB) | | | | | (LSB) |

Outputs of the first and third multiplexers 146 and 150 are inverted to be applied to input terminals of the fourth multiplexer 152. An output of the second multiplexer 148 is directly applied to the fourth multiplexer 152. Also, the output terminals Q ($Q_5$ to $Q_0$) of C register 142 and the input terminals B ($B_5$ to $B_0$) of the fourth multiplexer 152, are connected as follows.

| | (MSB) | | | | | (LSB) |
|---|---|---|---|---|---|---|
| Output Terminals Q of C and R register 142: | $Q_5$ | $Q_4$ | $Q_3$ | $Q_2$ | $Q_1$ | $Q_0$ |
| | \| | \| | \| | \| | \| | \| |
| Input Terminals A of First and Third Multiplexers 152 | $B_5$ | $B_4$ | $B_3$ | $B_2$ | $B_1$ | $B_0$ |
| | (MSB) | | | | | (LSB) |

By such construction of the edge emphasis mask unit 30, the weighting factor values shown in FIGS. 13A and 13B are produced.

The initial voltage of the L register 140, C register 142 and R register 144 are determined as the decimal digit 63, and the data latched by a clocking of the shading correction signal SHE is applied to the registers 140, 142 and 144 connected to the output terminals and to the input terminals A and B of the first, second and third multiplexers 146, 148 and 150. The data which is applied to the first multiplexer 146 by L register 140 can be understood more easily by the following embodiment. If the output of register 140 is "110001", the value applied to the input terminal A of first multiplexer 146 becomes "011000", and the value applied to the input terminal B of first multiplexer 146 becomes "001000".

It should be noted that the C register 142 and R register 144 operate similar to the above embodiment in accordance with the line connection thereof. When the edge emphasis control signal STG is "0", the first, second and third multiplexers 146, 148 and 150 select the input terminal A. When the edge emphasis signal control STG is "1", however, the first, second and third multiplexers 146, 148 and 150 select the input terminal B.

The output of first multiplexer 146 is inverted and applied to the input terminal A of fourth multiplexer 152. The output of second multiplexer 148 is applied to the input terminal C of fourth multiplexer 152. The output of third multiplexer 150 is inverted and applied to the input terminal D of fourth multiplexer 152. The output of C register 142 is applied to the input terminal B of fourth multiplexer 152. Accordingly, the fourth multiplexer 152 selects the data applied to the input terminals A, B, C and D in a sequential order, in response to the term selecting signal TMS of the edge emphasis controller 24 informing that an edge emphasis count is completed for each of the given pixel. Then the fourth multiplexer 152 outputs the data to the input terminal A of multiplexer 50 in the operation unit 20 shown in FIG. 3.

When the weighting factor values of FIG. 13A, namely L:C:R is equal to −0.5:2:−0.5, the edge emphasis performed in the edge emphasis mask unit 30 is described with reference to FIG. 13C. When the value inputted to the edge emphasis mask unit 30 becomes pixels at b to f on line 400, the edge emphasized result value, namely the pixels at b to f on a line 402, is as below.

| Result value: | b = 20 | → a b c MASKING |
|---|---|---|
| | c = −10+40−12.5 ≈ 17 | → b c d MASKING |
| | d = −10+50−15 = 25 | → c d e MASKING |
| | e = −12.5+60−15 ≈ 32 | → d e f MASKING |
| | f = 30 | → e f g MASKING |

In view of the above result value of the edge emphasis, it can be appreciated that the level of pixel at c goes down in comparison with the inputted value, and the level of pixel at e goes up in comparison with the inputted value. This clearly shows that the edge emphasis is performed on the image data.

After the local mask signal LMK is masked and emphasized in the edge emphasis mask unit 30, and when this signal is applied to the operation unit 20, operation of the operation unit 20 will be described with reference to the waveform of FIGS. 12A–12K as follows. If a central pixel value C of the edge emphasis mask unit 30 is '29'H, right and left pixels L and R become 'EB'H. That is, L=R=−0.5× C=−(0010100[1])=−(00010100)=11101011='EB'H, which [1] is 1 bit right shift. During the edge emphasis period as shown in FIGS. 12A–12K, the first and second input registers 52 and 54 are initiated by the output of AND gate 130 as shown in FIG. 3, and the outputs thereof are initiated with a value of '00'H. After that, the output of the second input register 54 has a value of 'EB'H, '29'H and 'EB'H, and the output of first input register 52 has a value of 'EB'H, '14'H and '3D'H.

The output data RGO (PA+PB → RGO) is emphasized in the edge with the values of '00'H+'00'H → '00'H, '00'H+ 'EB'H → 'EB'H, 'EB'H+'29'H → '14'H, '14'H+'29'H → '3D'H and '3D'H+'EB'H→ '28'H. The output value RGO responds to the clock signal ADCK outputted from AND gate 126 of the operation control signal generator 51. The result value of edge emphasis of operation unit 20 has the range of −63 to +126 and the values of output data RGO are all included in the range.

When the weighting factor values L:C:R are equal to −0.5:2:−0.5, and if the local mask signal LMK outputted from the edge emphasis mask unit 30 is '0', '63' and '0' as the real number value, the output result of operation unit 20 becomes 126. When the weighting factor values L:C:R are equal to −0.5:2:−0.5, and if the local mask signal LMK outputted from the edge emphasis mask unit 30 is '63', '0' and '63' as the real number value, the output result of operation unit 20 becomes −63.

Figure 7:
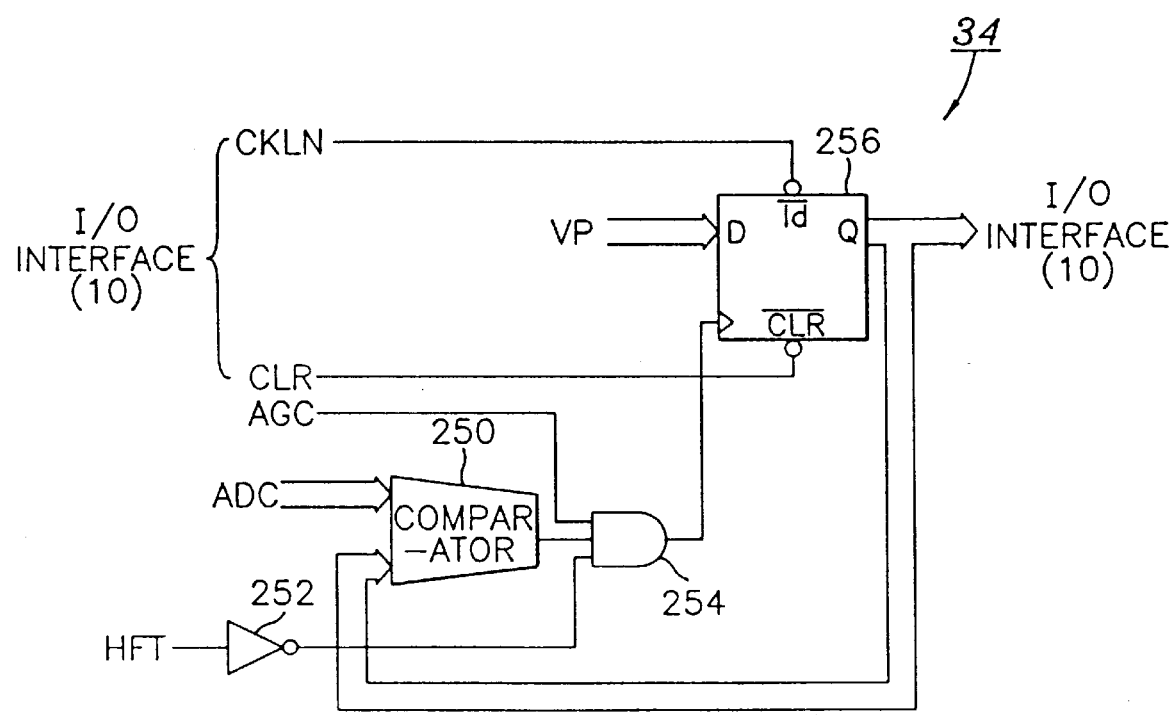
FIG. 7 illustrates a detailed circuit diagram of the voltage peak controller 34 as shown in FIG. 2.

The following describes the voltage peak controller 34 for controlling the voltage peak of the binary image in detail. The CPU 8 updates the voltage peak value VP stored in a voltage peak register of the memory 16 under the control of the voltage peak controller 34. FIG. 7 illustrates a detailed circuit diagram of the voltage peak controller 34 as comprising a counter 256 preset by the line clock CKLN outputted from the signal controller 14 of FIG. 1 through the I/O interface 10, for counting the voltage peak value VP of line unit stored in the memory 16 by the given clock applied to the clock terminal and for outputting the voltage peak value VP of new line unit; a comparator 250 for comparing the voltage peak value VP of line unit outputted from the counter 256 and the digital signal ADC of each pixel unit outputted from the ADC 6 of FIG. 1; and an AND gate 254 for logical-ANDing an output of the comparator 250, the automatic gain control enable signal AGC outputted through the I/O interface 10, and the half-tone mode signal HFT for processing the half-tone due to excess of the automatic control of the voltage peak in the half-tone process to produce a logical-ANDed result to a clock terminal of counter 256.

The comparator 250 again receives the voltage peak value VP counted in the counter 256 and compares the voltage peak value VP received with the digital signal ADC for each pixel unit. When the digital signal value ADC is larger than the voltage peak value VP counted in the counter 256, the comparator 250 outputs the value of "1". The AND gate 254 connected between the comparator 250 and the clock terminal of counter 256 has three input terminals so as to receive the automatic gain control enable signal AGC corresponding to the automatic gain control, the half-tone mode signal HFT corresponding to the half-tone process inverted by an inverter 252, and the output of comparator 250. Since an output line of the AND gate 254 is connected to the clock terminal of counter 256, when the logic operation value of AND gate 254 becomes "1", the counter 256 counts so that the voltage peak value VP can be increased by "1". If the binary logic state outputted from the AND gate 254 is "0", the counter 256 maintains the voltage peak value VP of an input state. The counter 256 receives the line clock CKLN and a reset signal CLR from the I/O interface 10. Therefore, the counter 256 is preset by the line clock CKLN and reset by the reset signal CLR. That is, the voltage peak value VP is controlled by the voltage peak controller 34 when the automatic gain control is in an enable state, namely, when the value of AGC is "1". The voltage peak value VP outputted from the voltage peak controller 34 is then updated in the voltage peak register of memory 16 through the I/O interface 10. Accordingly, the adaptive voltage peak value control in the voltage peak controller 34 has an advantage in that the document image can be reproduced more precisely.

Figure 8A:
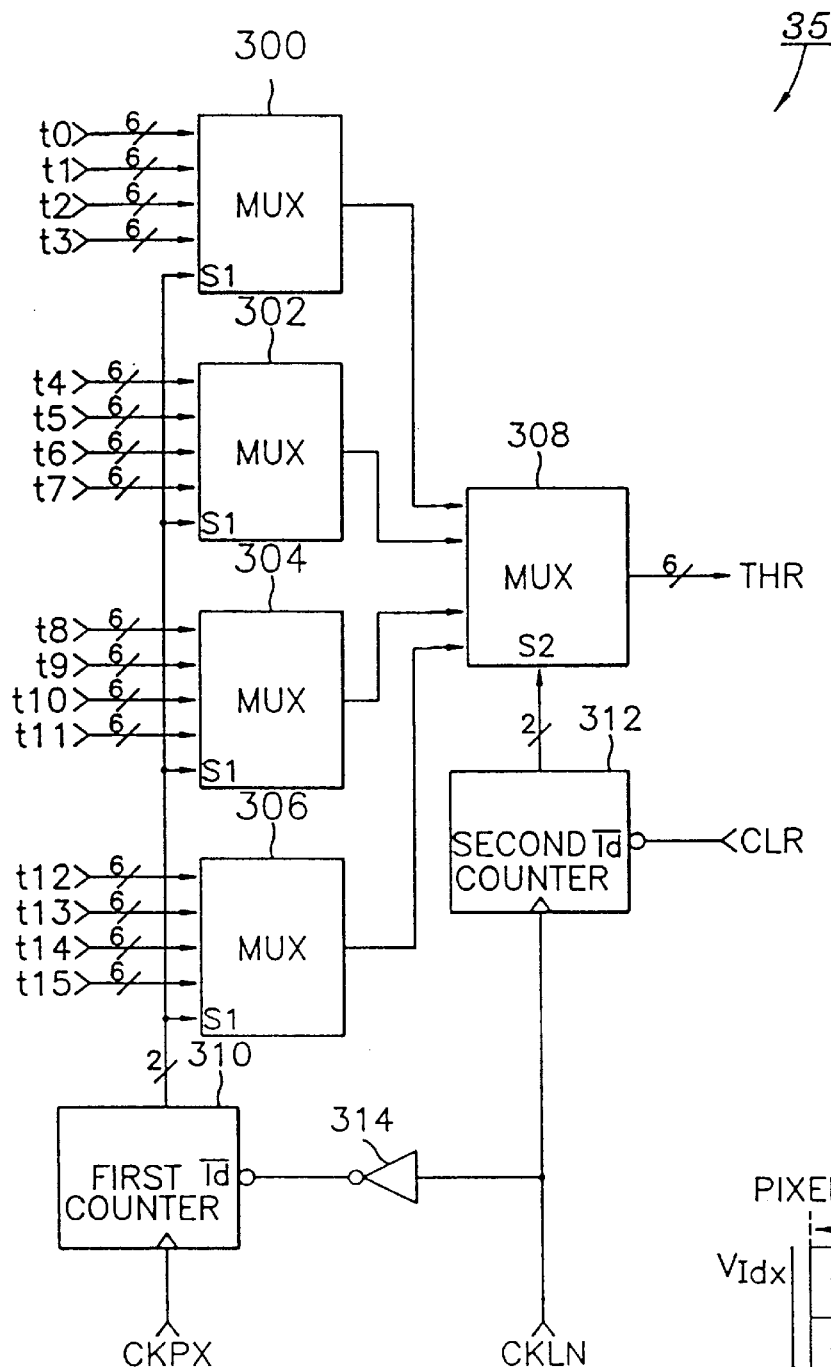
FIGS. 8A and 8B illustrate a detailed circuit diagram of the threshold generator 35 as shown in FIG. 2, and a threshold matrix where threshold horizontal and vertical indexes are updated.
Figure 8B:
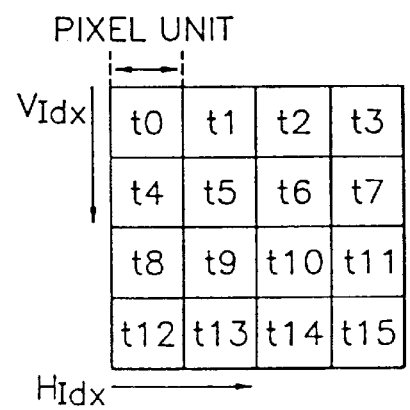

The following describes a construction and operation of the threshold generator 35 shown in FIG. 2 with reference to FIGS. 8A and 8B. When the binary image processor 2 processes the half-tone, the threshold generator 35 inputs the threshold data value DT with the same value as described the following process (1). Also, when the binary image processor 2 processes a character text or a line drawing of a document, the threshold generator 35 inputs the threshold data value DT with the same value as described the following process (2).

(1) A half-tone process

In the half-tone process, the threshold generator 35 receives the threshold data value DT from the data values stored in advance in the memory 16. That is, the threshold generator 35 respectively receives the threshold indexes $t_0$ to $t_{15}$ as shown in FIG. 8B.

(2) A process of text or drawing

In the process of a line drawing, before the binarization of respective lines of the image, the CPU 8 reads the present voltage peak value VP, and in correspondence with the read-out value, the threshold generator 35 reestablishes the threshold indexes to $t_0$ to $t_{15}$ to have the same threshold value as each other, that is, to have the threshold value $$\frac{VP}{8}.$$

At this time, the threshold indexes $t_0$ to $t_{15}$ have a range of $0 \leq t_0 \sim t_{15} \leq 32$, and the voltage peak value VP has a range of $0 \leq VP \leq 255$. Therefore, in the document process, the threshold generator 35 respectively inputs the same threshold data values.

FIG. 8A illustrates a detailed circuit diagram of the threshold generator 35, and FIG. 8B is a diagram illustrating a 4×4 threshold matrix embodied by the circuitry of the threshold generator 35. Referring to FIG. 8A, the threshold generator 35 is composed of four multiplexers 300, 302, 304 and 306 for receiving the threshold data value DT stored previously in the memory 16 by a given line unit in the half-tone process, with the threshold data value DT represented by threshold indexes $t_0 \sim t_3$, $t_4 \sim t_7$, $t_8 \sim t_{11}$ and $t_{12} \sim t_{15}$, and for selectively generating one of the received threshold indexes in response to a first selection signal; a multiplexer 308 for selecting a signal outputted from the multiplexers 300, 302, 304 and 306, and for generating the threshold value THR in response to a second selection signal; a first counter 310 for counting in response to the pixel clock CKPX outputted from the signal controller 14 and for generating the first selection signal to the selecting terminals S1 of multiplexers 300, 302, 304 and 306, so as to select a given threshold index of four multiplexers 300, 302, 304 and 306; and a second counter 312 for counting in response to the line clock CKLN outputted from the signal controller 14 shown in FIG. 1 and for generating the second selection signal, so as to select one output from the four multiplexers 300, 302, 304 and 306.

The first counter 310 is counted by the pixel clock CKPX and is preset by the line clock CKLN inverted by the inverter 314 and applied to a preset terminal $\overline{1\,d}$. In order to select one output among the outputs of multiplexers 300, 302, 304 and 306, the second counter 312 is connected to the selecting terminal S2 of multiplexer 308. The second counter 312 counts in response to the line clock CKLN and is reset by the reset signal CLR outputted from the signal controller 14 as shown in FIG. 1.

Referring to the 4×4 threshold matrix of FIG. 8B, the threshold indexes $t_0$ to $t_{15}$ represent one line unit stored in the memory 16. The threshold indexes $t_0$ to $t_{15}$ are divided into a vertical threshold index $V_{Idx}$, and a horizontal threshold index $H_{Idx}$. With each threshold index represents a pixel unit. A given threshold value ti has a pixel brightness data value of 0 to 63, wherein I is an integer and has an value of 0 to 15.

An operation of the threshold generator 35 in the half-tone process will be described with reference to FIGS. 8A and 8B as follows. The CPU 8 reads the threshold value stored in the memory 16 by each line unit and applies the threshold value to the threshold generator 35. The threshold indexes $t_0$ to $t_{15}$ representing the threshold value for one line unit are divided into four groups of threshold indexes $t_0$~$t_3$, $t_4$~$t_7$, $t_8$~$t_{11}$ and $t_{12}$~$t_{15}$, and each group is applied to a corresponding on of four multiplexers 300, 302, 304 and 306. The first counter 310 is preset by an inverted line clock CKLN through an inverter 314 and clocked by the pixel clock CKPX to produce a first count value with each count value increased by "1". The four multiplexers 300, 302, 304 and 306 select the vertical threshold index $V_{Idx}$ of first, second, third and fourth columns in response to the first count value applied to the selecting terminals S1. The second counter 312 is preset by the reset signal CLR and clocked by the line clock CKLN to produce a second count value with each count value increased by "1". The fifth multiplexer 308 selects one of the outputs of the four multiplexers 300, 302, 304 and 306 in response to the second count value applied to the selecting terminal S2. That is, the fifth multiplexer 308 selects and outputs the horizontal threshold index $H_{Idx}$ of first, second, third and fourth rows in regular order in response to the second count value applied to the selecting terminal S2. Threshold data THR outputted from the fifth multiplexer 308 is then inputted to the binary image determining unit 36.

Retuning back to FIG. 2, the binary image determining unit 36 as constructed in accordance with the principles of the invention is a comparator or its known equivalents used to compares the threshold data THR outputted from the threshold generator 35 with the binary image data EP outputted from the edge emphasis post-processing unit 26 to produce binary image data indicative of black or white pixel to the data output unit 40.

Accordingly, the data output unit 40 receives the data outputted from the binary image determining unit 36, and outputs the binary image data either to the TPH 18, or to the DMA controller 12 in response to the latch clock LHCK outputted from the data output controller 38. The latch clock LHCK provided from the data output controller 38 has a period of hundreds of nanosecond and operates either as a copy mode clock for copying the document, or as a transmission mode clock for transmitting the document from the data output unit 40.

The data output controller 38 selects either the shading correction signal SHE outputted from the shading correction controller 22 or the edge emphasis signal EGE outputted from the edge emphasis controller 24 in response to the data selecting signal DSS outputted from the CPU 8 for transmission as latch clock LHCK so as to enable the data output unit 40 to output the binary image data either to the TPH 18 for printing, or to the DMA controller 12 for transmission to another remote binary image processing apparatus or alike for printing.

Figure 9:
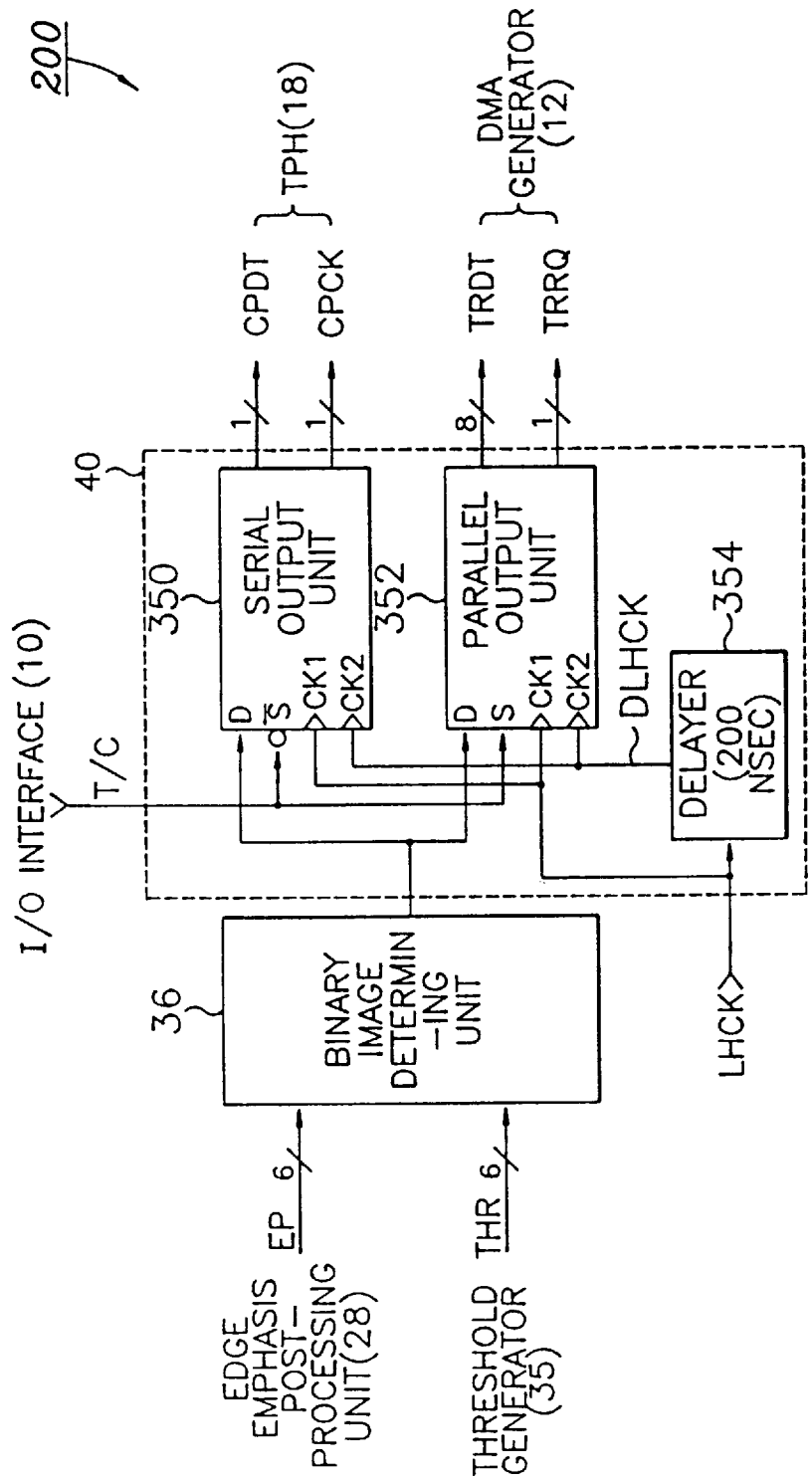
FIG. 9 illustrates a detailed circuit diagram of the data processing unit 200 comprising a binary image determining unit 36 and a data output unit 40 as shown in FIG. 2.

FIG. 9 illustrates a detailed circuit diagram of the data processing unit 200 as comprising the binary image determining unit 36 and the data output unit 40 as shown in FIG. 2. Referring to FIG. 9, the binary image determining unit 36 as shown in FIG. 2 operates as a comparator for comparing the data EP outputted from the edge emphasis post-processing unit 28 with the threshold data THR outputted from the threshold generator 35. The data EP outputted from the edge emphasis post-processing unit 28 is pixel brightness data of 6 bits after the completion of the shading correction or the edge emphasis after the completion of shading correction. Also, the threshold data THR outputted from the threshold generator 35 is pixel brightness data of 6 bits with the automatic gain control or with a constant value. Therefore, if the data EP is larger than the threshold data or is same as the threshold data, the binary image determining unit 36 decides the data as "0" (white pixel). If it is not, the binary image determining unit 36 decides the binary bit of image data as "1" (black pixel). Then the binary image determining unit 36 outputs the binary image data to the data output unit 40.

The data output unit 40 is composed of a serial output unit 350 for outputting the binary image data outputted from the binary image determining unit 36 to the TPH 18 when the mode selecting signal T/C outputted from the signal controller 14 represents a copy mode; a parallel output unit 352 for outputting the binary image data outputted from the comparator 36 to the DMA controller 12 when the mode selecting signal T/C outputted from the signal controller 14 represents a transmission mode; and a delayer 354 for latching a given clock in order to synchronize with the signals outputted from the serial output unit 350 and from the parallel output unit 352 so as to produce a delayed latch clock DLHCK.

The serial and parallel output units 350 and 352 are exclusively activated by the selection of the mode selecting signal T/C inputted through the I/O interface. A first clock terminals CK1 of the serial and parallel output units 350 and 352 are used to latch the output of the binary image determining unit 36. A second clock terminals CK2 of the serial and parallel output units 350 and 352 are used to generate a copy mode clock CPCK provided to the TPH 18 and a transmission requiring signal TRRQ provided to the DMA controller 12. A signal provided to the first clock terminals CK1 is the latch clock LHCK outputted from the data output controller 38 as shown in FIG. 2. Thus, it can be understood that the latch clock LHCK becomes the shading correction signal SHE and the edge emphasis signal EGE. The delayer 354 delays the latch clock LHCK by 200 nanosecond to produce the delayed latch clock DLHCK to the second clock terminals CK2.

Accordingly, the serial output unit 350 or the parallel output unit 352 selected by the mode selecting signal T/C latches the binary data outputted from the binary image determining unit 36 by the latch clock LHCK. Then, the serial output unit 350 or the parallel output unit 352, operates in the copy mode or in the transmission mode as described below.

In the copy mode, if the mode selecting signal T/C represents the copy mode, the serial output unit 350 is selected. The serial output unit 350 generates the copy mode clock CPCK at every pixel so as to transmit binary data CPDT to the TPH 18. The serial output unit 350 activates the binary data CPDT and the copy mode clock CPCK in response to the latch clock DLHCK delayed by the delayer 354.

In the transmission mode, if the mode selecting signal T/C represents the transmission mode, the parallel output unit 352 is selected. The parallel output unit 352 generates the transmission requiring signal TRRQ every eight pixels so as to transmit parallel binary data TRDT having 8 bits to the DMA controller 12. The parallel output unit 352 activates the parallel binary data of 8 bits TRDT and the transmission requiring signal TRRQ in response to the latch clock DLHCK delayed by the delayer 354.

As described above, the present invention has advantages in that high quality of the image and precise degree of resolution can be acquired from the original image in the facsimile machine. In addition, the present invention has advantages in that production cost can be reduced and high quality of binary image can be obtained.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A binary image processor in an image processing apparatus having an image sensor for reading an image, a converter for converting an electric signal read-out from said image sensor into image data, and a memory for storing a plurality of threshold indexes corresponding to each line unit of said image data, said binary image processor comprising:

threshold generating means for generating a threshold value corresponding to each input pixel of said image data, said threshold generating means comprising first multiplexer means for multiplexing between said plurality of threshold indexes to produce a plurality of discrete values in accordance with a first selection signal, second multiplexer means for multiplexing between said plurality of discrete values to produce said threshold value corresponding to each input pixel of said image data in accordance with a second selection signal, and counter means for counting a pixel clock to produce said first selection signal and counting a line clock to produce said second selection signal;

processing means coupled to receive said image data on a line-by-line basis, for correcting shading and emphasizing edge of said image data to produce processed data having said shading corrected and edge emphasized; and binarizing means for using half-tone processing to binarize each pixel of said processed data on a basis of said threshold value and generate binary data representing said image.

2. The binary image processor as claimed in claim 1, wherein said first multiplexer means comprises a first multiplexer for multiplexing between a first group of said threshold indexes to produce a first discrete value in accordance with said first selection signal, a second multiplexer for multiplexing between a second group of said threshold indexes to produce a second discrete value in accordance with said first selection signal, a third multiplexer for multiplexing between a third group of said threshold indexes to produce a third discrete value in accordance with said first selection signal, a fourth multiplexer for multiplexing between a fourth group of said threshold indexes to produce a fourth discrete value in accordance with said first selection signal; and said second multiplexer means corresponds to a fifth multiplexer for multiplexing between said first, second, third and fourth discrete values to produce said threshold value in accordance with said second selection signal.

3. The binary image processor as claimed in claim 1, wherein said binarizing means comprises:

a binary image determining unit for making a comparison between each binary bit of said processed data having said shading corrected and said edge emphasized with said threshold value corresponding to said binary bit to determine whether said binary bit represents "black" or "white" pixel, and for generating said binary data representing said image; and a data output unit for outputting said binary data representing said image for direct printing or distant transmission in response to a mode selection signal.

4. The binary image processor as claimed in claim 3, wherein said binary image determining unit comprises a comparator.

5. The binary image processor as claimed in claim 3, wherein said data output unit comprises:

a delay for providing a delayed latch clock by delaying a latch clock for a delayed period;

a serial output unit clocked successively by said latch clock and said delayed latch clock, for transmitting said binary data serially to a thermal print head for direct printing when said mode selection signal represents a copy mode; and a parallel output unit clocked successively by said latch clock and said delayed latch clock, for transmitting said binary data parallel to another binary image processor when said mode selection signal represents a transmission mode.

6. A binary image processor comprising:

threshold generating means for generating a threshold value corresponding to each input pixel of image data obtained by reading an image from an image sensor:

processing means coupled to receive said image data on a line-by-line basis, for correcting shading and emphasizing edges of said image data to produce processed data having shading corrected and edge emphasized, said processing means comprising:

a memory for storing a reference voltage value, a shading correction factor determined from a photoelectric conversion of said image sensor and said reference voltage value, and a plurality of threshold indexes for serving as a reference threshold value for binarization of said image data;

a control signal generator for responding to said shading correction factor read from said memory to generate a first control signal for controlling shading correction of said image data, and a second control signal for controlling edge emphasis of said image data, and a third control signal for controlling completion of said edge emphasis of each given pixel;

an edge emphasis mask unit for masking, in a given pixel unit, said processed data having said shading corrected so as to perform one or more levels of edge emphasis on a given pixel of said image data in response to said second control signal, and for generating edge emphasis data in response to said third control signal indicating said completion of said edge emphasis; and an operation unit for performing said shading correction of said image data in response to said first control signal and for performing said edge emphasis of said image data on a basis of said edge emphasis data in response to said second control signal to produce said processed data having said shading corrected and edge emphasized;

binarizing means for using half-tone processing to binarize each pixel of said processed data on a basis of said threshold value for generating binary data representing said image.

7. The binary image processor as claimed in claim 6, wherein said edge emphasis mask unit comprises:

multiplying means comprised of one or more registers for storing edge emphasis weighting factors and for multiplying each pixel unit of said image data with a corresponding edge emphasis weighting factor; and selecting means for selecting the output of said registers and generating said edge emphasis data in response to said third control signal.

8. The binary image processor as claimed in claim 6, wherein said control signal generator comprises:

an inverter for providing an inverted pixel clock signal by inverting a pixel clock signal;

a shading correction controller for responding to said pixel clock signal and an input clock signal to generate said first control signal for controlling the shading correction of said image data;

a shoot pulse generator for responding to said first control signal and said input clock signal to generate a shot pulse signal;

a first AND gate for logically combining said inverted pixel clock signal and said shot pulse signal to generate a first logic signal;

a second AND gate for logically combining said shot pulse signal and said first logic signal to generate a second logic signal;

an edge emphasis controller for responding to said second logic signal and said input clock signal to generate said second control signal for controlling the edge emphasis of said image data, and said third control signal for controlling the completion of said edge emphasis of each given pixel;

a shading factor generator coupled to receive said shading correction factor, for generating a shading factor control signal in response to said inverted pixel clock signal;

a third AND gate for logically combining said first control signal and an inverted of said second control signal to generate a third logic signal;

a fourth AND gate for logically combining an inverted of said first control signal and said shading factor control signal to generate a fourth logic signal;

a first OR gate for logically combining said first control signal and said shading factor control signal to generate an output latch signal to said operation unit;

a second OR gate for logically combining said third and fourth logic signals to generate a fifth logic signal; and a fifth AND gate for logically combining said fifth logic signal and said input clock signal to generate an output clock signal to said operation unit.

9. The binary image processor as claimed in claim 8, wherein said shading correction controller comprises:

a sixth AND gate for logically combining said input clock signal and said first control signal to generate a sixth logic signal; and a counter for making a binary count of said sixth logic signal upon reset of said inverted pixel clock signal and generating said first control signal when said binary count reaches a predetermined value.

10. The binary image processor as claimed in claim 8, wherein said edge emphasis controller comprises:

a sixth AND gate for logically combining said input clock signal and said second control signal to generate a sixth logic signal; and a counter for making a binary count of said sixth logic signal upon reset of said second logic signal and generating said second control signal and said third control signal when said binary count reaches a predetermined value.

11. The binary image processor as claimed in claim 8, wherein said operation unit comprises:

a multiplexer for multiplexing between said image data and said edge emphasis data and providing multiplexed data in response to said first control signal;

an operation selector for providing shifted data by shifting said processed data by a given bit in response to said first control signal;

a first input register having a clock terminal receiving said input clock signal, and a control terminal receiving said output latch signal, for temporarily storing said shifted data upon initialization by said first logic signal;

a second input register having a clock terminal receiving said input clock signal, for temporarily storing said multiplexed data upon initialization by said first logic signal; and means for correcting the shading of said image data by combining the output of said first and second input registers during a shading correction period and for emphasizing the edge of said image date by combining the output of said first and second input registers during an edge emphasis period, and for producing said processed data having said shading corrected and edge emphasized in response to said output clock signal.

12. The binary image processor as claimed in claim 6, wherein said operation unit operates as a multiplier for performing the shading correction of said image data, and as an adder for performing the edge emphasis of said image data.

13. The binary image processor as claimed in claim 6, further comprising:

a voltage peak controller for constantly maintaining an update of said reference voltage value stored in said memory for each line unit of said image data by comparing said reference voltage value stored in said memory with each pixel unit of said image data and restoring a compared result in said memory;

a shading correction post-processing unit connected to said operation unit and said edge emphasis mask unit, for clamping the range of pixel brightness values of said processed data having said shading corrected; and an edge emphasis post-processing unit connected to said operation unit, for limiting the range of pixel brightness values of said processed data having said shading corrected and edge emphasized.

14. The binary image processor as claimed in claim 13, wherein said voltage peak controller comprises:

a comparator for making a comparison between said reference voltage value stored in said memory with each pixel unit of said image data;

a AND gate for logically combining said comparison with an half-tone mode signal for the half-tone processing and an automatic gain control signal for voltage peak control to generate a logic value; and a counter having a clock terminal receiving said logic value, for counting said reference voltage value in a line unit upon reset by a line clock signal and for generating said reference voltage value for a next successive line unit as said compared result to be stored in said memory for determination of said shading correction factor.

15. A binary image processor, comprising:

means for inputting line-by-line image data obtained by reading an image;

threshold generating means for generating a threshold value corresponding to each input pixel of said image data, said threshold generating means comprising a plurality of first multiplexers for multiplexing between a plurality of threshold indexes stored in a memory to produce a plurality of discrete values, respectively, and a second multiplexer for selecting between said plurality of discrete values to produce said threshold value corresponding to each input pixel of said image data;

processing means for correcting image distortion of said line-by-line image data on a basis of a shading correction factor, and for emphasizing edge of said line-by-line image data to produce processed data having shading corrected and edge emphasized; and binarizing means for binarizing each pixel of said processed data on a basis of said threshold value and for generating binary data representing said image.

16. The binary image processor as claimed in claim 15, wherein said threshold generating means further comprises:

means for receiving said plurality of threshold indexes stored in said memory corresponding to each line unit of said image data;

a first counter for counting a pixel clock to produce a first selection signal for controlling individual operation of said plurality of first multiplexers; and a second counter for counting a line clock to produce a second selection signal to control operation of said second multiplexer.

17. A binary image processor comprising:

means for inputting line-by-line image data obtained by reading an image;

threshold generating means for generating a threshold value corresponding to each input pixel of said image data;

processing means for correcting image distortion of said image data on a basis of a shading correction factor, and emphasizing an edge of said image data to produce processed data having shading corrected and edge emphasized, said processing means comprising:

a memory for storing a reference voltage value, a shading correction factor determined from said image data obtained by a photoelectric conversion of said image and said reference voltage value, and a plurality of threshold indexes for serving as a reference threshold value for binarization of said image data;

a control signal generator for responding to said shading correction factor read from said memory to generate a first control signal for controlling shading correction of said image data, and a second control signal for controlling edge emphasis of said image data, and a third control signal for controlling completion of said edge emphasis of each given pixel;

an edge emphasis mask unit for masking, in a given pixel unit, said processed data having said shading corrected so as to perform one or more levels of edge emphasis on a given pixel of said image data in response to said second control signal, and for generating edge emphasis data in response to said third control signal indicating said completion of said edge emphasis; and an operation unit for performing said shading correction of said image data in response to said first control signal and for performing said edge emphasis of said image data on a basis of said edge emphasis data in response to said second control signal to produce said processed data having said shading corrected and edge emphasized; and binarizing mean for binarizing each pixel of said processed data on a basis of said threshold value to produce binary data representing said image.

18. The binary image processor as claimed in claim 17, wherein said edge emphasis mask unit comprises:

means for storing edge emphasis weighting factors and for multiplying each pixel unit of said image data with a corresponding edge emphasis weighting factor to produce a plurality of multiplied data; and means for making a selection from said plurality of multiplied data and generating said edge emphasis data in response to said third control signal.

19. The binary image processor as claimed in claim 17, wherein said control signal generator comprises:

a shading correction controller for responding to a pixel clock signal and an input clock signal to generate said first control signal for controlling the shading correction of said image data;

a shoot pulse generator for responding to said first control signal and said input clock signal to generate a shot pulse signal;

a first logic gate for logically combining an inverted pixel clock signal and said shot pulse signal to generate a first logic signal;

a second logic gate for logically combining said shot pulse signal and said first logic signal to generate a second logic signal;

an edge emphasis controller for responding to said second logic signal and said input clock signal to generate said second control signal for controlling the edge emphasis of said image data, and said third control signal for controlling the completion of said edge emphasis of each given pixel;

a shading factor generator for responding to said shading correction factor and generating a shading factor control signal in response to said inverted pixel clock signal;

a third logic gate for logically combining said first control signal and an inverted of said second control signal to generate a third logic signal;

a fourth logic gate for logically combining an inverted of said first control signal and said shading factor control signal to generate a fourth logic signal;

a fifth logic gate for logically combining said first control signal and said shading factor control signal to generate a fifth logic signal;

a sixth logic gate for logically combining said third and fourth logic signals to generate a sixth logic signal; and a seventh logic gate for logically combining said sixth logic signal and said input clock signal to generate an output clock signal.

20. The binary image processor as claimed in claim 19, wherein said shading correction controller comprises:

a eighth logic gate for logically combining said input clock signal and said first control signal to generate a eighth logic signal; and counter means for making a binary count of said eighth logic signal upon reset of said inverted pixel clock signal and generating said first control signal when said binary count reaches a predetermined value.

21. The binary image processor as claimed in claim 19, wherein said edge emphasis controller comprises:

a eighth logic gate for logically combining said input clock signal and said second control signal to generate a eighth logic signal; and counter means for making a binary count of said eighth logic signal upon reset of said second logic signal and generating said second control signal and said third control signal when said binary count reaches a predetermined value.

22. The binary image processor as claimed in claim 17, wherein said operation unit comprises:

a multiplexer for multiplexing between said image data and said edge emphasis data and providing multiplexed data in response to said first control signal;

an operation selector for providing shifted data by shifting said processed data by a given bit in response to said first control signal;

a first input register having a clock terminal coupled to receive said input clock signal, and a control terminal coupled to receive said output latch signal, for temporarily storing said shifted data upon initialization by said first logic signal;

a second input register having a clock terminal coupled to receive said input clock signal for temporarily storing said multiplexed data upon initialization by said first logic signal; and means for correcting the shading of said image data by combining the output of said first and second input registers during a shading correction period and for emphasizing the edge of said image date by combining the output of said first and second input registers during an edge emphasis period, and for producing said processed data having said shading corrected and edge emphasized in response to said output clock signal.

23. The binary image processor as claimed in claim 17, wherein said operation unit operates as a multiplier for performing the shading correction of said image data, and as an adder for performing the edge emphasis of said image data.

24. The binary image processor as claimed in claim 17, wherein said binarizing means comprises:

binary image determining means for making a comparison between each binary bit of said processed data having said shading corrected and said edge emphasized with said threshold value corresponding to said binary bit to determine whether said binary bit represents "black" or "white" pixel, and for generating said binary data representing said image; and data output means for outputting said binary data representing said image.

25. The binary image processor as claimed in claim 24, wherein said data output means comprises:

delay means for providing a delayed latch clock by delaying a latch clock for a delayed period;

means clocked successively by said latch clock and said delayed latch clock, for transmitting said binary data serially to a thermal print head for direct printing when said mode selection signal represents a copy mode; and means clocked successively by said latch clock and said delayed latch clock, for transmitting said binary data parallelly to another binary image processor when said mode selection signal represents a transmission mode.

26. The binary image processor as claimed in claim 17, further comprising:

voltage peak controller means for constantly maintaining an update of said reference voltage value stored in said memory for each line unit of said image data by comparing said reference voltage value stored in said memory with each pixel unit of said image data and restoring a compared result in said memory; and means for clamping the range of pixel brightness values of said processed data having said shading corrected and edge emphasized.

27. The binary image processor as claimed in claim 26, wherein said voltage peak controller means comprises:

comparator means for making a comparison between said reference voltage value stored in said memory with each pixel unit of said image data;

means for logically combining said comparison with an half-tone mode signal for the half-tone processing and an automatic gain control signal for voltage peak control to generate a logic value; and counter means for counting said reference voltage value in a line unit upon reset by a line clock signal and for generating said reference voltage value for a next successive line unit as said compared result to be stored in said memory for determination of said shading correction factor.

28. A binary image processor in a binary image processing apparatus having a memory storing a reference voltage value, a shading correction factor determined from electric signal obtained by photoelectric conversion and the reference voltage value, and a plurality of threshold indexes for serving as a reference threshold value for binarization of image data, said binary image processor comprising:

means for inputting line-by-line image data obtained by reading said image;

control signal generator means for responding to said shading correction factor read from said memory to generate a plurality of control signals for said shading correction and edge emphasis of said image;

edge emphasis mask means for masking, in a given pixel unit, so as to perform one or more levels of said edge emphasis on a given pixel, and for generating masked edge emphasis data in response to a first control signal indicative of a completion of said edge emphasis on said given pixel;

operation means for performing said shading correction of said image data in response to a second control signal and for performing said edge emphasis of said image data on a basis of said masked edge emphasis data in response to a third control signal to produce said processed data having said shading corrected and edge emphasized; and binarizing means for binarizing each pixel of said processed data on a basis of said reference threshold value and for generating binary data representing said image.

29. The binary image processor as claimed in claim 28, wherein said control signal generator means comprises:

a shading correction controller for responding to a pixel clock signal and an input clock signal to generate said second control signal for controlling the shading correction of said image data;

a shoot pulse generator for responding to said second control signal and said input clock signal to generate a shot pulse signal;

an edge emphasis controller for generating said third control signal for controlling the edge emphasis of said image data, and said first control signal for controlling the completion of said edge emphasis of each given pixel; and a shading factor generator for responding to said shading correction factor and generating a shading factor control signal in response to an inverted pixel clock signal.

30. The binary image processor as claimed in claim 29, wherein said shading correction controller comprises a counter for making a binary count of a line clock signal upon reset of said inverted pixel clock signal and generating said second control signal when said binary count reaches a predetermined value.

31. The binary image processor as claimed in claim 29, wherein said edge emphasis controller comprises a counter for making a binary count of a line clock signal and generating said first and third control signals when said binary count reaches a predetermined value.

32. A binary image processor of a facsimile machine, comprising:

a memory for storing a shading factor for a shading correction, a voltage peak value corresponding to a white reference of an image and a threshold value for determining one of a black and white pixel of said image on a pixel-by-pixel basis;

threshold generating means for generating said threshold value stored in said memory by a line clock of a given pixel unit and by a pixel clock corresponding to each pixel unit;

voltage peak control means for comparing image data obtained from reading an image with voltage peak value stored in said memory, so as to adaptively control the voltage peak value corresponding to the white reference of said image, and for restoring the compared voltage peak value in said memory;

shading correction control means for generating a shading correction signal for a shading correction of said image during a first time period provided by said pixel clock;

edge emphasis control means for generating an edge emphasis signal for an edge emphasis of said image during a second time period provided by said shading correction signal;

edge emphasis masking means for masking said image data so as to perform one or more levels of the edge emphasis on a given pixel, and for emphasizing an edge of the masked image data in response to said edge emphasis signal;

operation means for selecting and operating arithmetically said image data and said masked image data in response to said shading correction signal and said edge emphasis signal;

binary image determining means for determining whether each pixel unit of said image data corresponds to one of said black and white pixel of said image by comparing a value operated arithmetically by said operation means with said threshold value; and data output means for outputting binary image data determined by said binary image determining means.

33. The binary image processor as claimed in claim 32, wherein said data output means comprises:

delay means for providing a delayed latch clock by delaying a latch clock for a delayed period;

means clocked successively by said latch clock and said delayed latch clock, for transmitting said binary data serially to a thermal print head for direct printing when a mode selection signal represents a copy mode; and means clocked successively by said latch clock and said delayed latch clock, for transmitting said binary data in parallel to another binary image processor when said mode selection signal represents a transmission mode.

34. The binary image processor as claimed in claim 33, wherein said shading correction control means comprises a counter for making a binary count of a line clock and generating said shading correction signal when said binary count reaches a predetermined value.

35. The binary image processor as claimed in claim 33, wherein said edge emphasis control means comprises a counter for making a binary count of a line clock and generating said edge emphasis signal when said binary count reaches a predetermined value.

36. A binary image processor, comprising:

an image sensor for inputting line-by-line image data obtained by reading an image;

a memory for storing a reference voltage value, a shading correction factor determined from a photoelectric conversion of said image and said reference voltage value, and a plurality of threshold indexes for serving as a variable threshold value for binarization of said image data;

a threshold generating unit for generating said variable threshold value from said plurality of threshold indexes corresponding to each input pixel of said image data in accordance with a background intensity of said image read from said image sensor;

a processor unit responsive to said shading correction factor read from said memory, for performing shading correction of said image data and for subsequently performing edge emphasis of said image data to produce processed data having shading corrected and edge emphasized, said processor unit comprising a shading correction controller for controlling the shading correction of said image data in dependence upon said shading correction factor, and an edge emphasis controller for controlling the edge emphasis of said image data; and a binary unit for binarizing each pixel of said processed data on a basis of said variable threshold value to produce binary data representing said image.

37. The binary image processor as claimed in claim 36, wherein said binary unit comprises a binary image determining means for making a comparison between each binary bit of said processed data having said shading corrected and said edge emphasized with said variable threshold value corresponding to said binary bit to determine whether said binary bit represents one of "black" and "white" pixel for generating said binary data representing said image; and data output means for outputting said binary data representing said image.

38. The binary image processor as claimed in claim 37, wherein said data output means comprises:

delay means for providing a delayed latch clock by delaying a latch clock for a delayed period;

means clocked successively by said latch clock and said delayed latch clock, for transmitting said binary data serially to a thermal print head for direct printing when a mode selection signal represents a copy mode; and means clocked successively by said latch clock and said delayed latch clock, for transmitting said binary data parallelly to another binary image processor when said mode selection signal represents a transmission mode.

* * * * *